(12) United States Patent
Spitzer et al.

(10) Patent No.: US 9,092,878 B2
(45) Date of Patent: Jul. 28, 2015

(54) METHOD AND SYSTEM FOR PROCESSING AN IMAGE

(75) Inventors: Hedva Spitzer, Tel-Aviv (IL); Yuval Barkan, Kraf-Sirkin (IL); Lonia Kanelovitch, Holon (IL); Itzchak Yacov, Ramat-Gan (IL); Arie Rundstein, Herzlia (IL); Miriam Sklair-Levy, Mevasseret Zion (IL)

(73) Assignees: Ramot at Tel-Aviv University Ltd., Tel-Aviv (IL); Tel HaShomer Medical Research Infrastructure and Services Ltd., Ramat-Gan (IL)

( * ) Notice: Subject to any disclaimer, the term of this patent is extended or adjusted under 35 U.S.C. 154(b) by 297 days.

(21) Appl. No.: 13/501,110

(22) PCT Filed: Oct. 12, 2010

(86) PCT No.: PCT/IL2010/000831
§ 371 (c)(1),
(2), (4) Date: Jun. 28, 2012

(87) PCT Pub. No.: WO2011/045784
PCT Pub. Date: Apr. 21, 2011

(65) Prior Publication Data
US 2012/0257808 A1 Oct. 11, 2012

Related U.S. Application Data

(60) Provisional application No. 61/272,604, filed on Oct. 13, 2009.

(51) Int. Cl.
*G06K 9/40* (2006.01)
*G06T 5/40* (2006.01)
*G06T 5/00* (2006.01)

(52) U.S. Cl.
CPC . *G06T 5/40* (2013.01); *G06T 5/008* (2013.01); *G06T 5/009* (2013.01); *G06T 2207/10072* (2013.01); *G06T 2207/30068* (2013.01)

(58) Field of Classification Search
CPC . G06T 5/00; G06T 5/007; G06T 2207/10072; G06T 5/008; G06T 5/009
USPC .......................................................... 382/128
See application file for complete search history.

(56) References Cited

U.S. PATENT DOCUMENTS 5,717,791 A * 2/1998 Labaere et al. ............... 382/274
7,289,667 B2 * 10/2007 Nenonen et al. ............. 382/169

(Continued)

FOREIGN PATENT DOCUMENTS

WO WO 2009/057106 5/2009
WO WO 2009/081394 7/2009

OTHER PUBLICATIONS

Marius George Linguraru, Kostas Marias, Ruth English, Michael Brady, "A biologically inspired algorithm for microcalcification cluster detection, Medical Image Analysis", vol. 10, Issue 6, Dec. 2006, pp. 850-862.*

(Continued)

*Primary Examiner* — Utpal Shah

(57) ABSTRACT

A method of processing an image having a plurality of picture-elements is disclosed. The method comprises: preprocessing the image to selectively enhance contrast of some picture-elements of the image, and employing a companding procedure for the preprocessed image, thereby providing a processed image. The contrast enhancement optionally and preferably features a mapping function having a plateau region for diminishing image data with intensity levels below an intensity threshold, thereby providing a preprocessed image.

25 Claims, 13 Drawing Sheets
(6 of 13 Drawing Sheet(s) Filed in Color)

(56) References Cited

U.S. PATENT DOCUMENTS 7,466,848 B2 * 12/2008 Metaxas et al. ............... 382/128
2004/0165086 A1    8/2004 Spitzer et al.
2005/0069186 A1 *  3/2005 Kobayashi ................... 382/128

OTHER PUBLICATIONS

Communication Pursuant to Article 94(3) EPC Dated Jan. 22, 2013 From the European Patent Office Re. Application No. 10787556.9.
International Preliminary Report on Patentability Dated Apr. 26, 2012 From the International Bureau of WIPO Re. Application No. PCT/IL2010/000831.
International Search Report and the Written Opinion Dated Feb. 22, 2011 From the International Searching Authority Re. Application No. PCT/IL2010/000831.
Barkan et al. "Brightness Contrast-Contrast Induction Model Predicts Assimilation and Inverted Assimilation Effects", Journal of Vision, 5: 1-16, 2005.
Dahari et al. "Spatiotemporal Adaptation Model for Retinal Ganglion Cells", Journal of the Optical Society of America A, 13: 419-435, 1996.
Li et al. "Compressing and Companding High Dynamic Range Images With Subband Architectures", ACM Transactions on Graphics, XP003010943, 24(3): 836-844, Jul. 1, 2005.
Mayo et al. "Diffusion Equations With Negentropy Applied to Denoise Mammographic Images", Proceedings of the 28th IEEE Annual International Conference of the IEEE, Engineering in Medicine and Biology Society, EMBS '06, XP031236587, p. 4751-4754, Aug. 30, 2006.
Mrázek et al. "Selection of Optimal Stopping Time for Nonlinear Diffusion Filtering", International Journal of Computer Vision, 52: 189-203, 2003.
Perona et al. "Scale-Space and Edge Detection Using Anisotropic Diffusion", IEEE Transactions on Pattern Analysis and Machine Intelligence Archive, 12: 629-639, 1990.
Spitzer et al. "Biological Gain Control for High Dynamic Range Compression", 11th Color Imaging Conference: Color Science and Engineering Systems, Technologies, and Applications, p. 42-50, Nov. 2003.
Weickert "Efficient Image Segmentation Using Partial Differential Equations and Morphology", Pattern Recognition, XP004362604, 34(9): 1813-1824, Sep. 1, 2001.

* cited by examiner

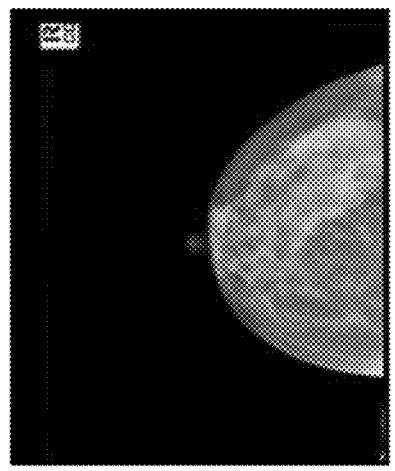 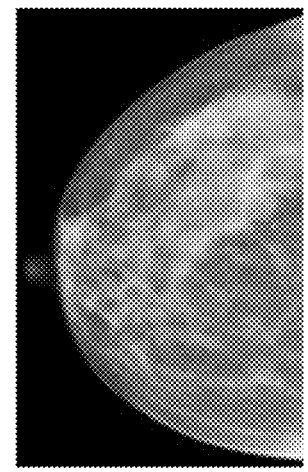
FIG. 2A  FIG. 2B
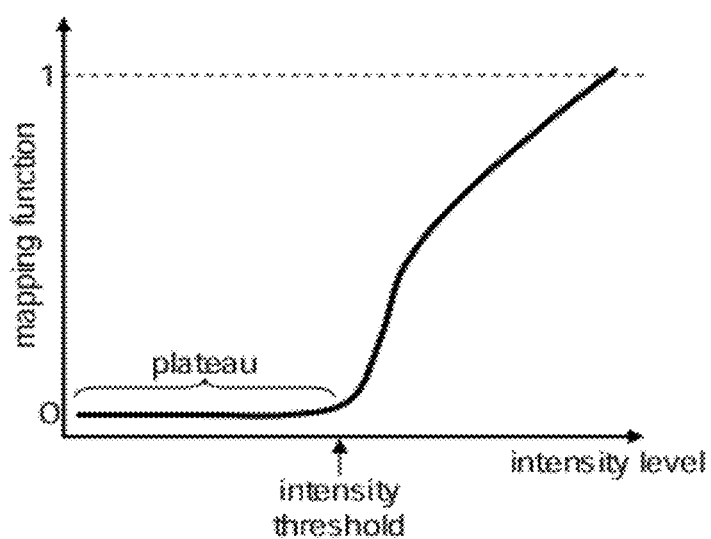
FIG. 3

METHOD AND SYSTEM FOR PROCESSING AN IMAGE

RELATED APPLICATION

This application is a National Phase of PCT Patent Application No. PCT/IL2010/000831 having International filing date of Oct. 12, 2010, which claims the benefit of priority from U.S. Provisional Patent Application No. 61/272,604, filed Oct. 13, 2009. The contents of the above applications are hereby incorporated by reference as if fully set forth herein.

FIELD AND BACKGROUND OF THE INVENTION

The present invention, in some embodiments thereof, relates to image processing and, more particularly, but not exclusively, to a method and system for companding an image.

Commercially available imaging devices are known to acquire image information across a wide dynamic range of several orders of magnitude. Typically, although at the time of image capture the acquired dynamic range is rather large, a substantial portion of it is lost once the image is digitized, printed or displayed. For example, most images are digitized to 8-bits (256 levels) per color-band, i.e., a dynamic range of about two orders of magnitude. The problem is aggravated once the image is transferred to a display or a print medium which is often limited to about 50 levels per color-band.

The motivation for developing imaging devices capable of capturing high dynamic range images is explained by the enormous gap between the performances of the presently available devices and the ability of the human visual system to acquire detailed information from a high dynamic range scene. Specifically, the human visual system, which is capable of acquiring a dynamic range of several orders of magnitude, can easily recognize objects in natural light having a high dynamic range. On the other hand, high quality images suffer, once displayed on a screen or printed as a hard copy, from loss of information. For example, when the difference in intensities between a shaded object and its illuminated surroundings reaches a dynamic range of 2 orders of magnitudes, presently available display devices may not be able to recognize it.

High dynamic range images are also employed in the medial diagnostic field, where digital imaging systems have become increasingly important and often preferred over conventional techniques.

For example, in current digital X-ray imaging systems, radiation from a source is directed toward a subject, and a portion of the radiation passes through the subject and impacts a detector. The surface of the detector converts the radiation to light photons which are sensed. The detector is divided into a matrix of discrete picture elements, and encodes output signals based upon the quantity or intensity of the radiation impacting each pixel region. Because the radiation intensity is altered as the radiation passes through the patient, the images reconstructed based upon the output signals provide a projection of the patient's tissues similar to those available through conventional photographic film techniques.

However, the dynamic range of the digital detector may be different from that of a display device, and some image data is lost during the transmission from the detector to the display, and the image data is oftentimes adapted to that of the display. For example, in a typical CT scan, the attenuation coefficient typically ranges from −1000 (air) to 2500 (bones), namely a dynamic range of more than three orders of magnitude.

Additional background art includes U.S. Published Application No. 20040165086, International Patent Publication Nos. WO2004/075535 and WO2009/081394, the contents of which are hereby incorporated by reference.

SUMMARY OF THE INVENTION

According to an aspect of some embodiments of the present invention there is provided a method of processing an image having a plurality of picture-elements. The method comprises: preprocessing the image to selectively enhance contrast of some picture-elements of the image using a mapping function having a plateau region for diminishing image data with intensity levels below an intensity threshold, thereby providing a preprocessed image. The method further comprises employing a companding procedure for the preprocessed image, thereby providing a processed image, and outputting the processed image to a computer readable medium or a display device.

According to an aspect of some embodiments of the present invention there is provided a system for processing an image having a plurality of picture-elements. The system comprises: an input unit for receiving the image, and a preprocessing unit configured for preprocessing the image to selectively enhance contrast of some picture-elements of the image using a mapping function having a plateau region for diminishing image data with intensity levels below an intensity threshold, hence to provide a preprocessed image. The system further comprises a companding unit which compands the preprocessed image.

According to some embodiments of the invention the invention the system further comprises an imaging system for acquiring the image, wherein the input unit receives the image from the imaging system.

According to an aspect of some embodiments of the present invention there is provided a computer-readable medium having stored thereon a computer program. the computer program comprises code means that when executed by a data processing system, carry out the processing operation described herein.

According to some embodiments of the invention the method further comprises removing isolated objects from the image, prior to the selective contrast enhancement.

According to some embodiments of the invention the removal of the isolated objects features a connected components labeling procedure.

According to some embodiments of the invention the intensity threshold is an average intensity over all picture-elements of the image having intensity levels within a predetermined intensity range.

According to some embodiments of the invention the image is an image of a section of a living body and the intensity threshold is correlated with intensity levels characterizing fatty tissue present in the body section.

According to some embodiments of the invention the mapping function comprises a monotonic region for intensity levels above the intensity threshold.

According to some embodiments of the invention the companding procedure comprises, for each picture element of the preprocessed image: (i) defining a surrounding region of picture elements and a remote region of picture elements; (ii) calculating at least one adaptation weight; and (iii) using the at least one adaptation weight and intensity levels of each picture element of the surrounding and the remote regions, for assigning a new intensity level to the picture element, the new intensity level being in a dynamic range which is smaller than the dynamic range of the preprocessed image.

According to some embodiments of the invention the adaptation weight describes, at least in part, contrast induction between the surrounding region and the remote region.

According to some embodiments of the invention the adaptation weight features a plurality of different resolutions, and wherein the contrast induction is calculated separately for each resolution.

According to some embodiments of the invention for each resolution, the contrast induction is calculated as a subtraction between intensity levels integrated over the surrounding region and intensity levels integrated over a central region.

According to some embodiments of the invention the method comprises employing anisotropic diffusion procedure for reducing noise. According to some embodiments of the invention the system comprises a noise reduction unit configured for employing anisotropic diffusion procedure.

According to some embodiments of the invention the image is a mammography image. According to some embodiments of the invention the processed image exhibits Cooper's ligaments. According to some embodiments of the invention the method comprises identifying and highlighting Cooper's ligaments in the processed image.

According to some embodiments of the invention the system comprises a functionality for highlighting Cooper's ligaments in the processed image.

According to some embodiments of the invention the image is an X-ray image other than a CT image.

According to some embodiments of the invention the image is a gamma image.

According to some embodiments of the invention the image is a PET image.

According to some embodiments of the invention the image is a SPECT image.

According to some embodiments of the invention the image is a thermal image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart diagram of a method suitable for processing an image according to various exemplary embodiments of the present invention;

Figure 5:
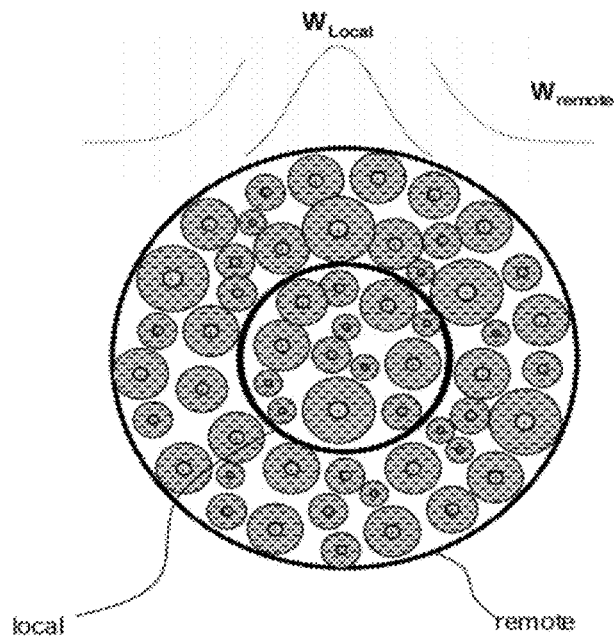
Figure 6A:
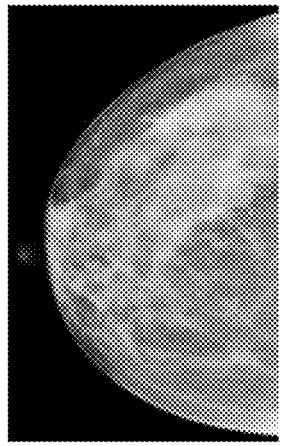
Figure 6B:
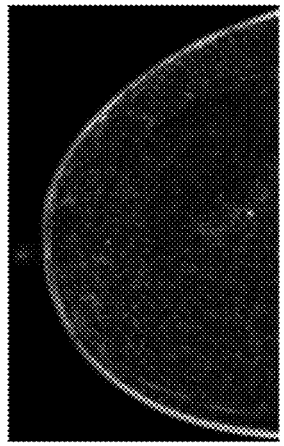
Figure 6C:
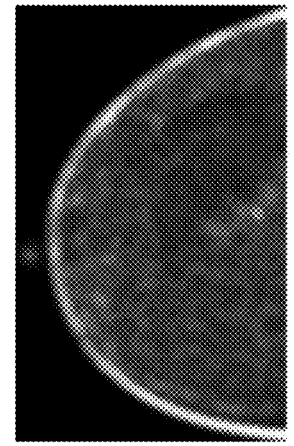
Figure 7A:
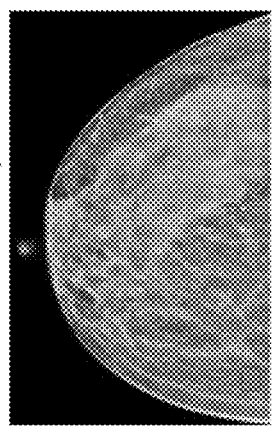
Figure 7B:
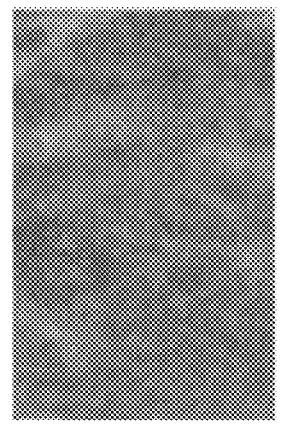
Figure 7C:
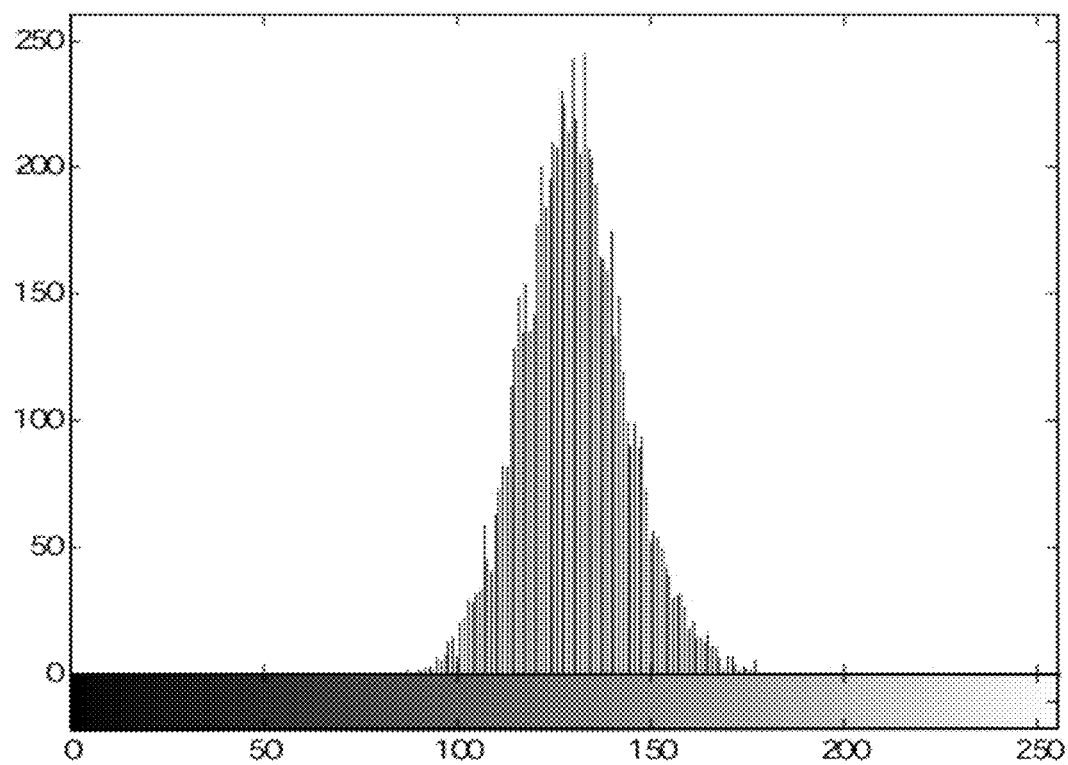
Figure 8:
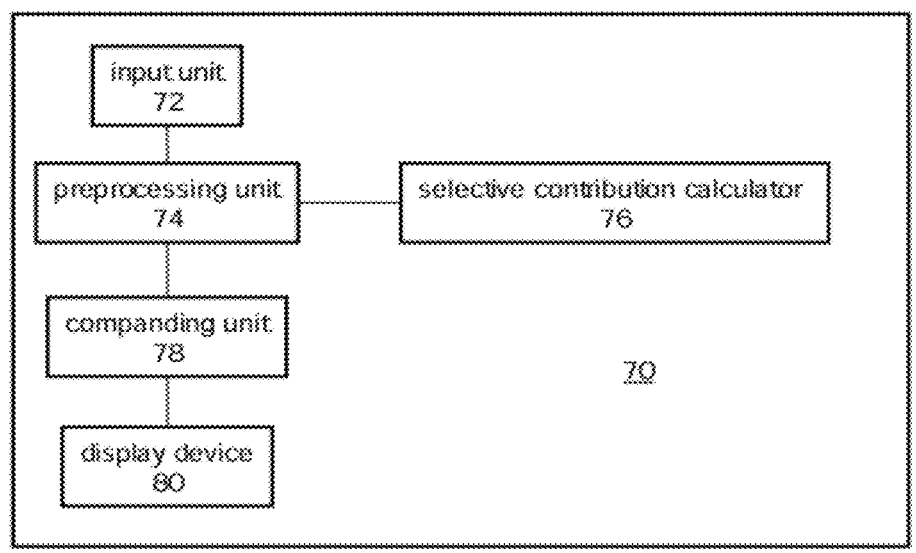
Figure 9:
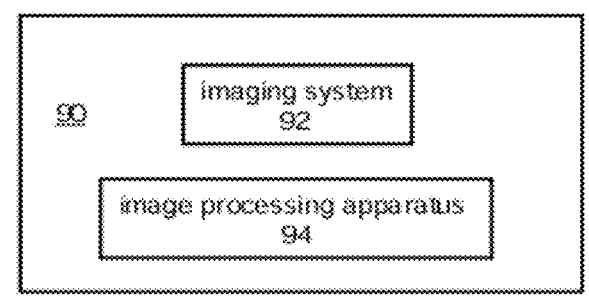
Figure 10A:
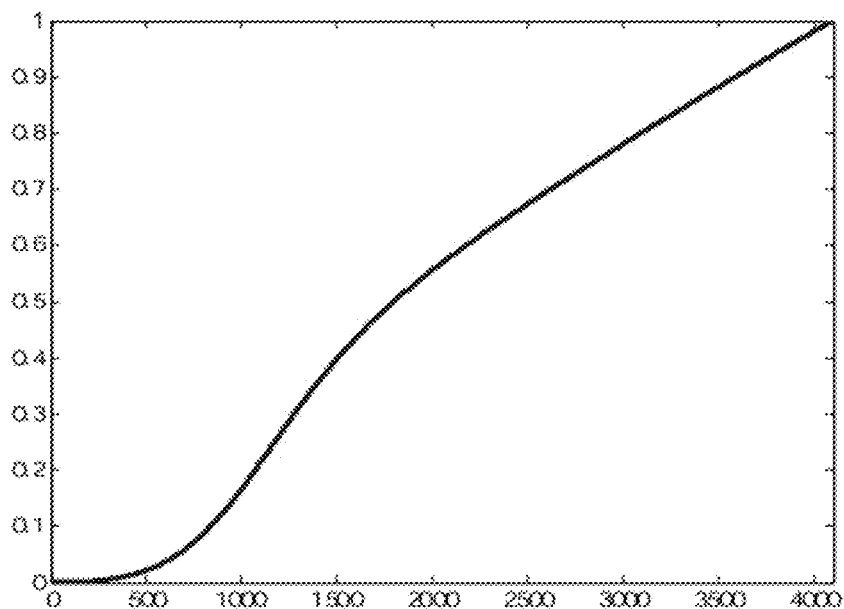
Figure 10B:
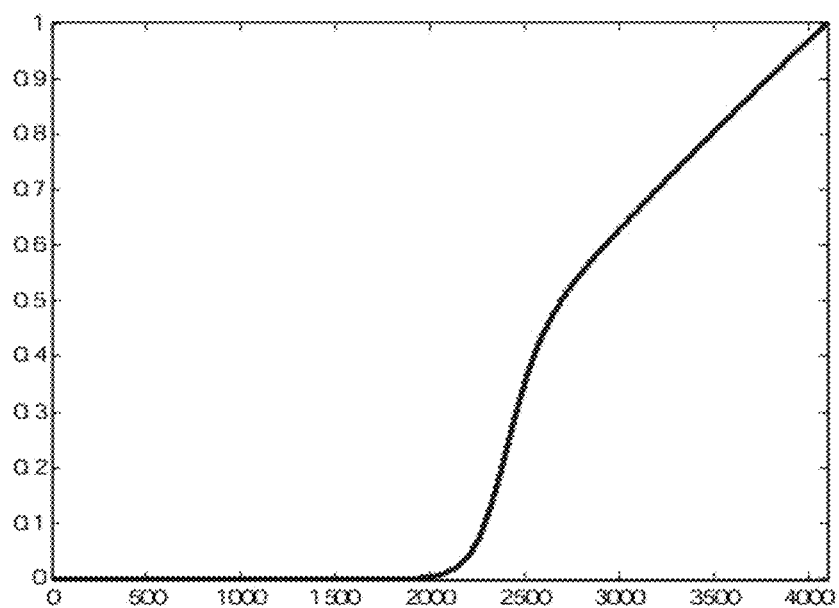
Figure 11:
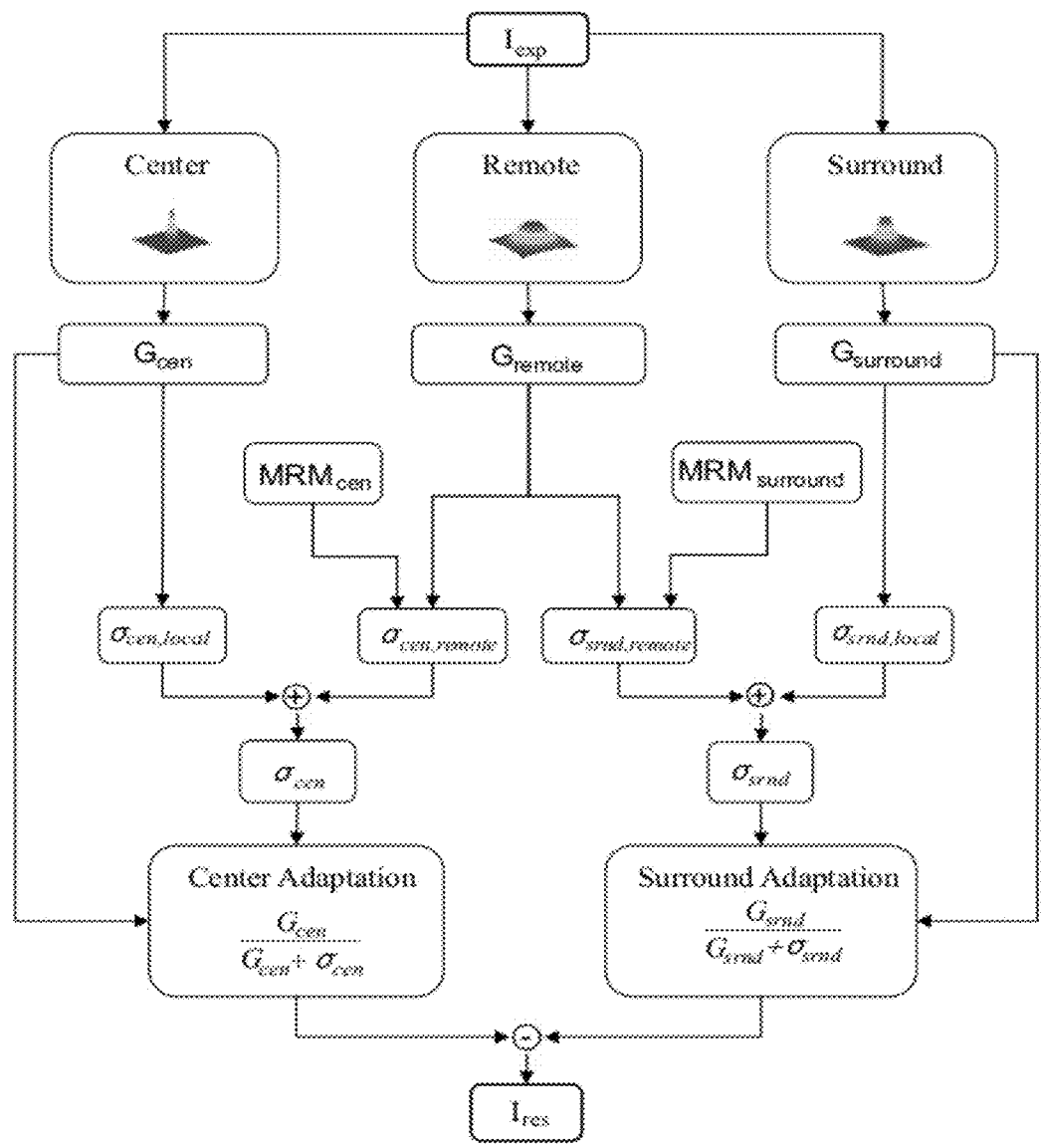
Figure 12A:
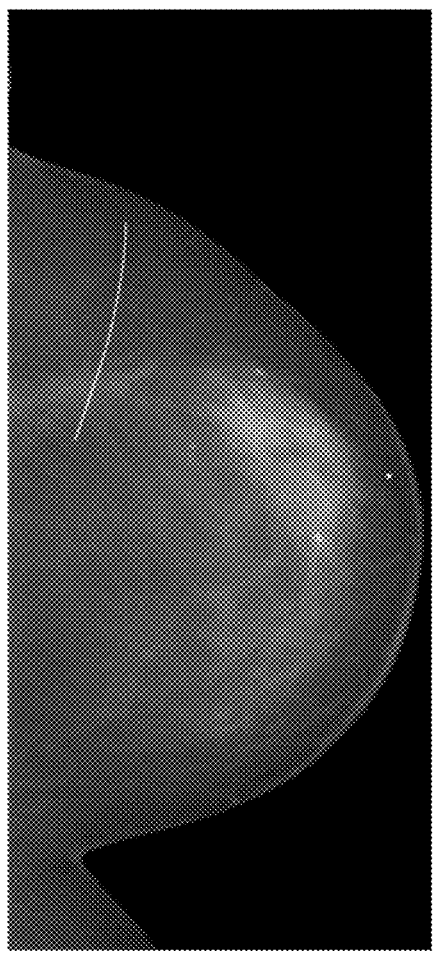
Figure 12B:
Figure 12C:
Figure 12D:
Figure 12E:
Figure 12F:
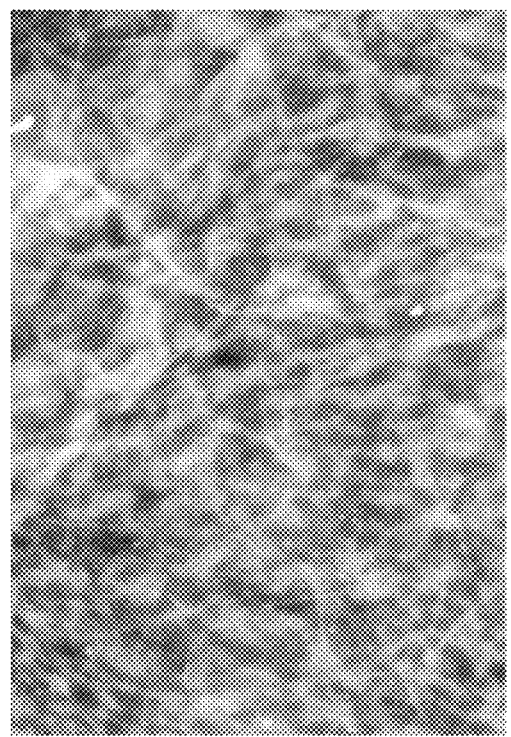

FIGS. 2A-B show the effect of an isolated objects removal procedure, performed according to some embodiments of the present invention;

FIG. 3 shows a mapping function which can be applied according to some embodiments of the present invention for selective contrast enhancement;

Figures 4A, 4B:
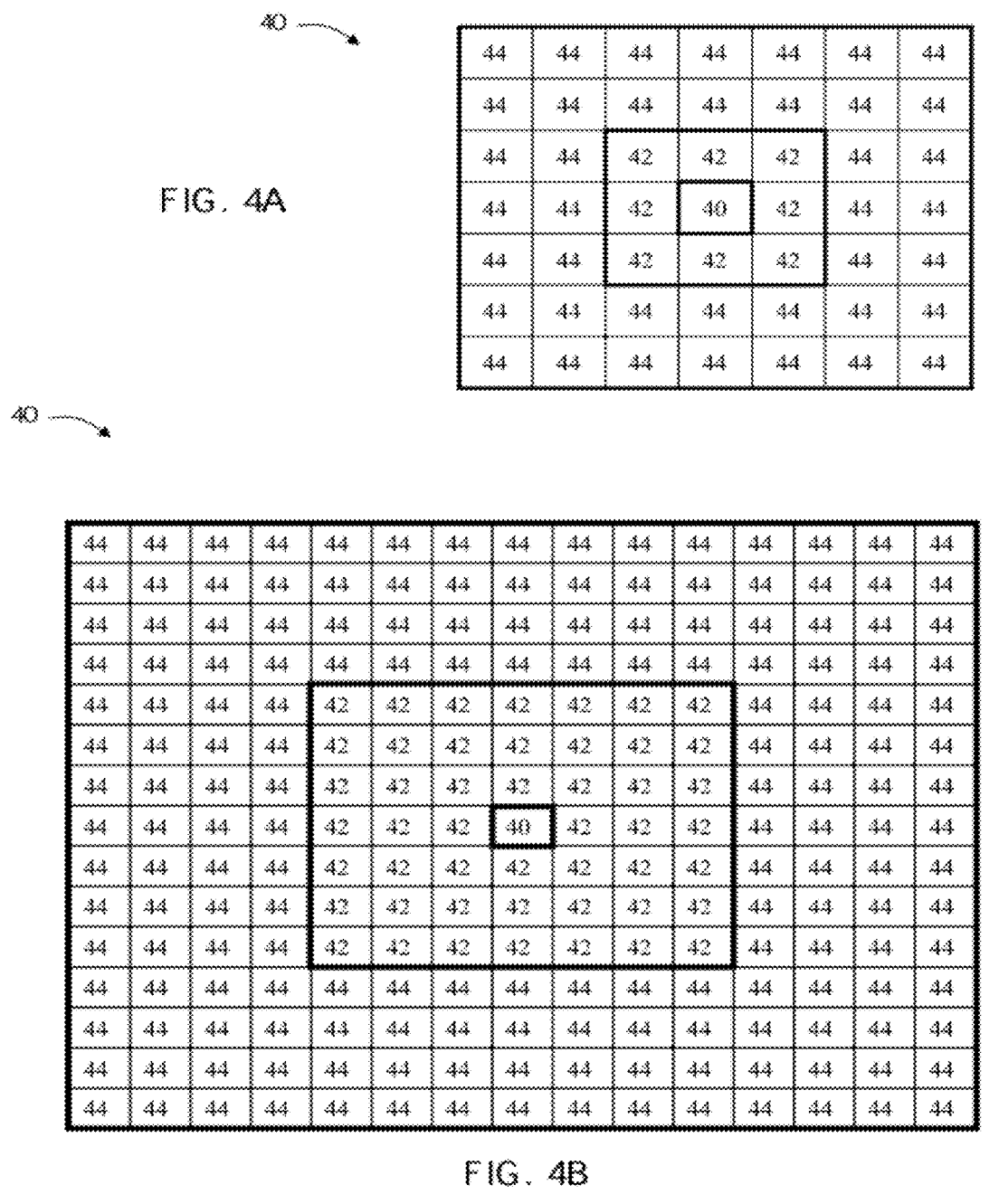

FIGS. 4A-B are schematic illustrations of a center, surrounding and remote regions, according to some embodiments of the present invention;

FIG. 5 is a schematic illustration of a procedure for calculating a contrast quantifier, according to some embodiments of the present invention;

FIGS. 6A-C show the effect of the contrast quantifiers of some embodiments of the present invention;

FIGS. 7A-C show noise analysis of a mammogram, performed according to some embodiments of the present invention;

FIG. 8 is a simplified illustration of a system for processing an image, according to some embodiments of the present invention;

FIG. 9 is a simplified illustration of an imaging and processing system, according to some embodiments of the present invention;

FIGS. 10A-B show representative examples of mapping functions as constructed according to some embodiments of the present invention for a KODAK mammography system (FIG. 10A) and a GE mammography system (FIG. 10B);

FIG. 11 is a flowchart diagram describing a companding procedure used in experiments performed in accordance with some embodiments of the present invention;

FIGS. 12A-F show representative examples of unprocessed mammograms (FIGS. 12A, 12C and 12E) and the same mammograms following image processing performed in accordance with some embodiments of the present invention (FIGS. 12B, 12D and 12F).

Figure 13A:
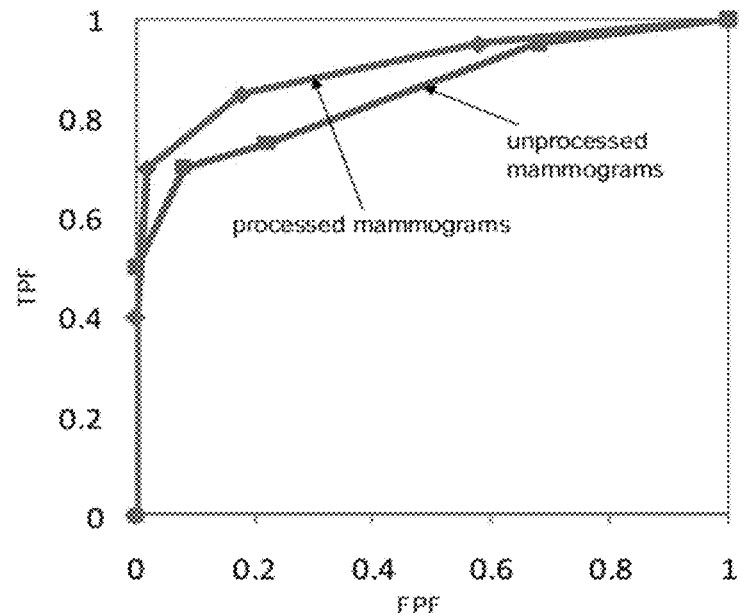
Figure 13B:
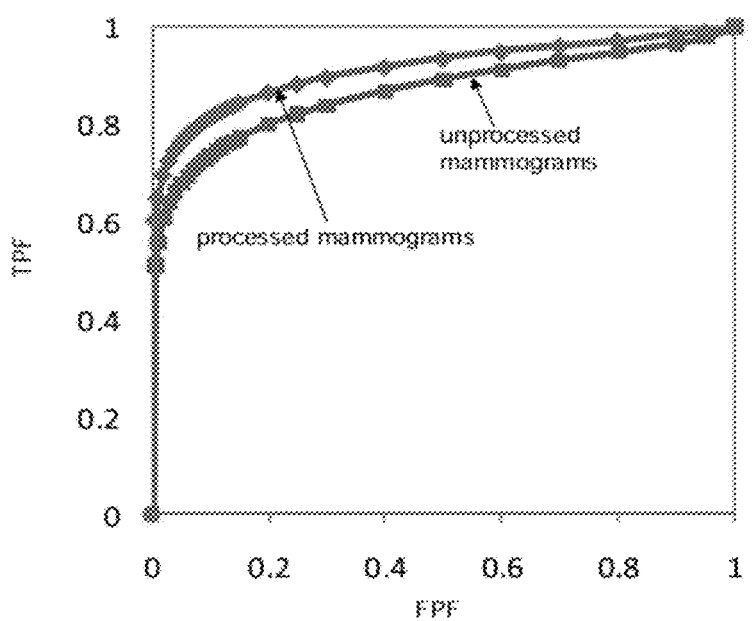
Figure 14A:
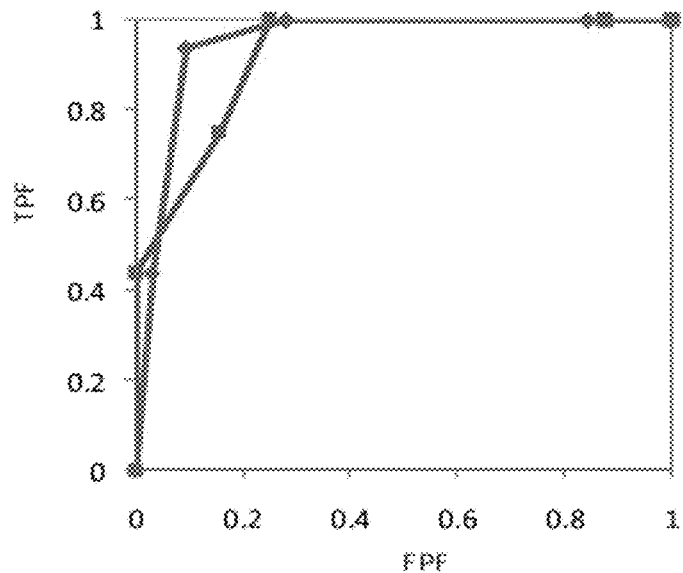
Figure 14B:
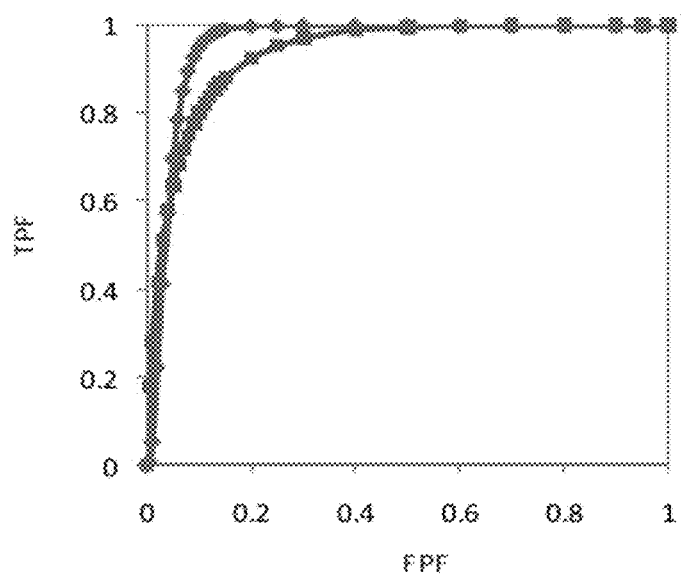

FIGS. 13A-B show Receiver Operating Characteristic (ROC) analysis applied to data received from an expert radiologist; and FIGS. 14A-B show Receiver Operating Characteristic (ROC) analysis applied to data received from another expert radiologist;

DESCRIPTION OF SPECIFIC EMBODIMENTS OF THE INVENTION

The present invention, in some embodiments thereof, relates to image processing and, more particularly, but not exclusively, to a method and system for companding an image.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present embodiments are concerned with method and system for processing an image to facilitate its display or, in some embodiments of the present invention, to allow recognizing in the image features that would not be recognized without the inventive processing. At least part of the processing can be implemented by a data processing system, e.g., a computer, configured for receiving the image and executing the operations described below.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The image to be analyzed using the teachings of the present embodiments is generally in the form of imagery data arranged gridwise in a plurality of picture-elements (e.g., pixels, group of pixels, etc.).

The term "pixel" is sometimes abbreviated herein to indicate a picture-element. However, this is not intended to limit the meaning of the term "picture-element" which refers to a unit of the composition of an image.

References to an "image" herein are, inter alia, references to values at picture-elements treated collectively as an array. Thus, the term "image" as used herein also encompasses a mathematical object which does not necessarily correspond to a physical object. The original and processed images certainly do correspond to physical objects which are the scene from which the imaging data are acquired.

Each pixel in the image can be associated with a single digital intensity value, in which case the image is a grayscale image. Alternatively, each pixel is associated with three or more digital intensity values sampling the amount of light at three or more different color channels (e.g., red, green and blue) in which case the image is a color image. Also contemplated are images in which each pixel is associated with a mantissa for each color channels and a common exponent (e.g., the so-called RGBE format). Such images are known as "high dynamic range" images.

In some embodiments of the invention, the image is an X-ray image, also known as a roentgenogram or radiograph. These embodiments are particularly useful for medical application. For example, the image can be an X-ray image of a breast of a human subject, in which case the image is referred to as a mammography image or a mammogram.

It is generally accepted that mammography is an effective and reliable procedure in the early detection of breast cancer. Mammography is typically performed using X-ray, but may also be performed using other imaging modalities which are not excluded from the scope of the present invention. It is recognized by the present inventors that traditional mammography does not always provide adequately high-quality images to detect cancer, particularly in the relatively large population of women having radiodense breast tissue (e.g., younger women). Unlike other X-ray images, mammograms require high-quality images because the tissue density between adipose (fatty), glandular, calcified, or cancerous tissue is less diverse than, for example, flesh and bone. The present inventors recognized that subtler contrasts are desirable to distinguish between these types of tissue.

Traditional film mammograms have a non-linear response to x-ray exposure. That is, for example, doubling the x-ray exposure of film or halving the breast density, does not result in an image that is twice as bright. As a result, a single traditional film x-ray exposure often does not show the entire tonal range of a patient's breast tissue. Often, a radiologist may take exposures at different energy levels to provide images with different contrasts. This exposes the patient to several doses of x-rays. Recently, digital mammography has been proposed as a technology which replaces the phosphor/film detector with a digital image detector, with the prospect of overcoming some of the limitations of film-screen mammography in order to provide higher quality mammographic images. The advantage of digital mammography is that it allows separating the image acquisition from the image display. An additional advantage is that digital detectors provide a much greater range of contrast than film and the contrast response is linear over the entire range. This allows digital detectors to more easily distinguish subtle differences in attenuation of x-rays as they pass through soft tissue in the breast. Other advantages of digital mammography include digital image archival and image transmission to remote locations for viewing purposes.

Thus, in various exemplary embodiments of the invention the image is a digital mammogram. Optionally, the processing is performed such as to allow the radiologist to view the entire information simultaneously without having to adjust the gain. A mammogram processed according to this embodiment is advantageous over traditional mammograms since in traditional digital mammograms (either mammograms which are acquired digitally, or mammograms that are acquired analogically and sampled digitally thereafter) the dynamic range is typically larger than that of the display device. For example, when a digital mammogram has $2^{12}=4096$ intensity levels, conventional displays, featuring $2^8$-$2^{10}$ gray levels are insufficient for displaying the full dynamic range of the mammogram, and a substantial portion of the information is lost once the mammogram is displayed. Thus, in conventional mammograms, the radiologist oftentimes has to adjust the gain of the display device such that each time a different portion of the dynamic range is displayed.

The present embodiments are also useful for processing other digital images, particularly images in which the intensity or grey-level values are relative and not absolute. Thus, besides mammograms, images suitable for processing according to the technique of the present embodiments include, but are not limited to, X-ray images other than CT images, gamma images, PET images, SPECT images, thermal images and the like.

Figure 1:
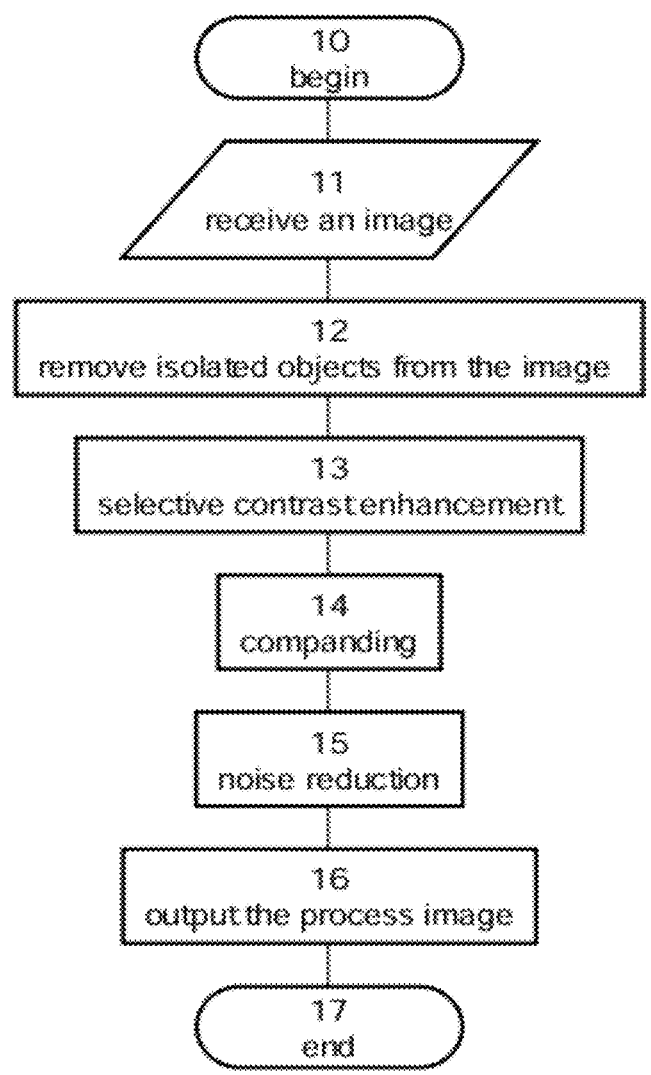

Referring now to the drawings, FIG. 1 is a flowchart diagram of a method suitable for processing an image according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and continues to 11 at which an image is received, preferably in a digital form. The method optionally and preferably continues to 12 at which the image is processed for removing isolated objects from the image. It is recognized by the present inventors that isolated elements can yield a high local and remote contrast responses, which contrasts may screen other objects from the image. Thus, the removal of isolated elements moderates the contrasts in the image and facilitates the companding operation at later stages of the processing.

In various exemplary embodiments of the invention the isolated objects are removed by employing a connected components labeling procedure. In the labeling procedure each picture-element is checked to determine if it is connected to adjacent picture-element, all belonging to the same connected component. If the picture-element is determined to be connected to an already identified component, it is labeled with the same component number given to that component, and if the picture-element is determined not to be connected to an already identified component, it is given or labeled with a new component number.

Once all or most of picture-elements in an image are checked the largest component or several largest components in the labeled image is preferably identified and kept, while all other components are removed from the image. This provides a new image which only includes the non-removed object or objects. Such image is referred to herein as segmented image. A connected components labeling procedure suitable for the present embodiments is found, e.g., in Gonzalez et al., (2003) Digital image processing using MATLAB, 55-69, 65-76, Prentice-Hall, Inc. Upper Saddle River, N.J., USA.

In various exemplary embodiments of the invention 12 is preceded by a down-sampling process selected to reduce the number of identified components in the image. This operation is preferably employed when it is desired to reduce the processing time. However, when the computing resources are sufficient, such down-sampling is not necessary. Also contemplated, are embodiments in which the input data are normalized, preferably prior to the execution of 12. The normalization is optional and serves for computation convenience. Normalization can be performed by linear transformation which is bases on the principles of a cumulative distribution function (CDF). Thus, for example, the lowest value of input intensity can be mapped to a predetermined percentage at the left hand side of the CDF (e.g., the 5th percentage) and the highest value of input intensity is mapped to a predetermined percentage at the right hand side of the CDF (e.g., the 95th percentage). Formally, such linear transformation can be written as:

$$I \to \frac{I\_high - I\_low}{I\_0.95 - I\_0.05}(I - I\_0.95) + I\_high \qquad (EQ.\ 1)$$

where I_high and I_low are, respectively, the highest and lowest input intensity levels and I_0.05 and I_0.95 are, respectively, the intensity levels of the CDF at the 5th and 95 percentages.

A representative example of the effect of 12 as applied to a mammogram is shown in FIGS. 2A and 2B, where FIG. 2A shows the input mammogram and FIG. 2B shows the largest connected object after the removal of isolated objects from the mammogram.

The method optionally and preferably continues to 13 at which a selective contrast enhancement is applied to enhance the contrast of some picture-elements of the image. In various exemplary embodiments of the invention the contrast of picture-element with low intensity levels is enhanced. In some embodiments, image data with intensity levels below some intensity threshold are diminished. Image data with sufficiently high intensity levels preferably remains unchanged. These embodiments preferably feature a mapping function having a plateau region below the intensity threshold.

A representative example of such mapping function is illustrated in FIG. 3, showing the dependence of the mapping function on the intensity levels. As shown, the mapping function has a plateau for intensity levels below the intensity threshold and is monotonic for intensity levels above the intensity threshold. The value of the mapping function at the plateau is such that once the function is applied to the image data, any picture-element with intensity level below the intensity threshold receives a new intensity level which is zero or close to zero (e.g., below 0.05 or below 0.01) at the plateau region.

A mathematical expression suitable to be used as a mapping function is:

$$I_{exp}(x, y) = \frac{1}{1 + e^{-a(I(x,y)-c)}} \cdot I(x, y)^b, \qquad (EQ.\ 2)$$

where the pair (x,y) is the location of the corresponding picture-element over the image, I is the input intensity level of (x, y), $I_{exp}$ is the new assigned intensity level of (x,y), and a, b and c are constants. The constant a is associated with the slope of the curve, the constant c is associated with the intensity threshold and the constant b is a associated with the curvature of the curve.

The intensity threshold can be predetermined or, more preferably, it can be calculated based on the input image data before the contrast enhancement 13 is executed.

In some embodiments of the present invention the intensity threshold is an average intensity over all picture-elements of the image having intensity levels within a predetermined intensity range. These embodiments are particularly useful for mammograms which are acquired digitally. The predetermined intensity range is typically expressed as a fraction of the entire range of input intensities. For example, the predetermined intensity range can include all intensities between percentage X and percentage Y, where X and Y are percentage values, e.g., X can be from about 1 to about 5 and Y can be from about 28 to about 32. When the aforementioned normalization is employed the predetermined intensity range can be derived from the CDF of the image.

A mathematical expression suitable for calculating the intensity threshold, c, according to some embodiments of the present invention is:

$$c = \frac{\int_{I_s\_0.02}^{I_s\_0.3} I_s \cdot f(I_s) dI_s}{\int_{I_s\_0.02}^{I_s\_0.3} f(I_s) dI_s}, \quad \text{(EQ. 3A)}$$

where f represents the CDF and $I_s$ represents the input intensity level. The integration limits $I_s\_0.02$ and $I_s\_0.3$ are intensity levels corresponding to the 2nd and 30th percentages of the CDF. Thus, $I_s\_0.02$ satisfies $f(I_s\_0.02)=0.02$ and $I_s\_0.3$ satisfies $f(I_s\_0.3)=0.3$. Percentages other than 2 and 30 are not excluded from the scope of the present invention. When Equation 3A is used for calculating the intensity threshold c, the values of the parameters a and b in Equation 2 are preferably fixed. Typical values for these parameters are from about 0.001 to about 0.05 for a, and from about 0.2 to about 2 for b.

In some embodiments of the present invention the intensity threshold is calculated based on the fraction RL of picture-elements having intensity levels within a predetermined intensity range. These embodiments are particularly useful for mammograms which are acquired analogically but are thereafter converted to digital images. The predetermined intensity range depends on the type of imaging system. For example, for a KODAK mammography system, the range can be from about 400 to about 800, but it is not intended to limit the scope of the present invention for this range. RL is the number of picture-elements having intensity levels within the predetermined intensity range as a fraction of the total number of picture-elements. Once RL is determined, the intensity threshold is preferably calculated as a linear function of RL, e.g., $$c = p_0 + p_1 RL \quad \text{(EQ. 3B)}$$

where $p_0$ and $p_1$ are constant parameters. Typical values for $p_0$ and $p_1$ are $p_0=1100$ and $p_1=-100$. When Equation 3B is used for calculating the intensity threshold c, the values of the parameters a and b in Equation 2 are preferably also calculated as linear functions of RL. Representative examples of such linear functions are provided in the Examples section that follows.

Also contemplated, are combination of embodiments, for example, calculation of c using Equation 3A and calculation of a and/or b using linear functions of RL, or calculation of c using Equation 3B and fixing the values of a and/or b, When the image is an image of a section of a living body the intensity threshold c is preferably correlated with intensity levels characterizing fatty tissue present in body section. This embodiment is particularly useful for mammograms where the fatty tissue generally has low contrast, and it is desired to selectively enhance the contrast at picture-elements corresponding to fatty tissue.

At 14, a companding procedure is employed so as to reduce the dynamic range of the image to a second dynamic range which is displayable on a display device.

Generally, the companding procedure, shrinks the prominent gradients over the image (compression) but emphasized small details therein (expansion). The companding can be according to any companding procedure known in the art. Representative examples include the companding procedure described in U.S. Published Application No. 20040165086, International Patent Publication Nos. WO2004/075535 and WO2009/081394, the contents of which are hereby incorporated by reference. Also contemplated is the companding procedures disclosed in Yuanzhen et al. "Compressing and companding high dynamic range images with subband architectures," International Conference on Computer Graphics and Interactive Techniques Proceedings of ACM SIGGRAPH 2005 (2005) pages 836-844, and Duan et al., "Comprehensive Fast Tone Mapping for High Dynamic Range Image Visualization," Proceedings of Pacific Graphics (2005). Also contemplated are combinations of the techniques disclosed in two or more of the above documents. A preferred companding procedure will now be explained.

The following procedure is inspired by a known physiological phenomenon in the human vision system which is called "induction phenomenon." According to this mechanism, the perceived image is not just a simple function of the stimulus from specific receptor cell, but rather a more complicated combination of other stimuli, originating from other receptors in the field of view.

Hence, a given ganglion cell in the retina receives input both from receptors at the center receptive field area and receptors of nearby, referred to below as surrounding, receptive field area. The human vision mechanism operates in the retinal ganglion cell by subtracting surround responses from center responses. In addition, it is believed that the processing at the retinal ganglion cell level further includes influences of responses from receptors being in a "remote" area of the receptive field that is even farther than the "surround" area from the "center" area. These influences are typically through the amacrine cells and horizontal cells of the retina.

The companding procedure of the present embodiments is described below for an arbitrarily chosen picture-element, generally referred to herein as element 40. It is to be understood that various embodiments of the invention are applied independently for most or all the picture-elements of the image.

The companding procedure of the present embodiments preferably defines several regions in the vicinity of picture-element 40 (but not necessarily adjacent thereto) are defined. In various exemplary embodiments of the invention a surrounding region and a remote region are defined for element 40. In some embodiments, a center region comprises element 40 and picture elements immediately adjacent to element 40, is also defined. Alternatively, the center region may be a single element region, hence comprising only element 40. This alternative, of course, coincide with the embodiment in which no center region is selected.

As further detailed hereinafter, the regions, preferably measured in units of picture-elements, are used to simulate the physiological adaptation mechanism of the human visual system.

The concept of the center, surrounding and remote regions may be better understood from the following example, with reference to FIGS. 4A-B. Thus, if the picture elements are arranged in a rectangular grid 46, the center region may be a single picture element (element 40), the surround region may be picture elements 42 surrounding picture elements 40 and the remote region may be picture elements 44, surrounding picture elements 42.

In FIG. 4A, the surround region comprises eight picture-elements immediately surrounding (i.e., adjacent to) element 40, and the remote region comprises 40 picture-element forming the two layers surrounding those eight picture-elements. However, this need not necessarily be the case, since, for some applications, it may be desired to extend the surround region farther from those eight elements which immediately surround element 40. FIG. 4B, for example, illustrates an embodiment in which the surround region comprises 48 picture-element which form the first three layers surrounding element 40, and the remote region comprises 176 picture-element which form the four layers surrounding those 48 elements. Also contemplated are embodiments in which the center region comprises more picture-element, e.g., an arrangement of 2×2 or 3×3 picture-elements. Other definitions for the center, surrounding and remote regions are not excluded from the present invention, both for a rectangular grid or for any other arrangement according to which the picture elements of the image are inputted.

Once the surround and optimally the remote and/or center regions are defined, the intensities of the picture elements in each region are preferably used for calculating, for each region, an overall regional intensity, $G_r$, where the subscript "r" is to be understood as a regional subscript. Specifically, for the center region r should be replaced by the subscript "center", for the surrounding region r should be replaced by the subscript "surround" and for the remote region r should be replaced by the subscript "remote".

According to a preferred embodiment of the present invention the overall intensity may be calculated using a regional spatial profile, $f_r$. More preferably, the overall intensity is calculated as an inner product or convolution of the intensity level I of the picture elements in each region with the respective regional spatial profile. Preferably, the intensity level following the aforementioned selective contrast enhancement is employed. Mathematically this inner product or convolution is realized by the following equation:

$$G_r = \int I * f_r \, ds \qquad (EQ. 4)$$

where the integration is to be understood as convolution, and where ds is an area integration measure, which is selected in accordance with the arrangement of the inputted picture elements, e.g., for a rectangular x-y grid-like arrangement ds equals dx dy. The regional spatial profiles, $f_r$, used for calculating the overall regional intensities are preferably spatial decaying functions, with may have different forms, depending on the region in which the profiles are applied. Examples for the specific form of each regional spatial profile include, but are not limited to, a Gaussian, an exponent, a Lorenzian, a modified Bessel function and a power-decaying function. These function are typically characterized by a slope, denoted $K_r$ (r="center", "surround", "remote"), which may be different for each region.

The integration of Equation 4 spans over the respective region. Typically, but not necessarily, for the overall center intensity, $G_{center}$, the integration spans over a single picture element (element 40). For example, when a picture-element is a pixel, $G_{center}$ can equal the intensity level associated with this pixel. For the overall surround intensity $G_{surround}$, the integration can extend over a radius of 3 picture-elements, not including element 40, and for the overall remote intensity, $G_{remote}$, the integration area can extend over an annulus having an inner radius of 3 picture-elements and an outer radius of 7 picture-elements (see, e.g., FIG. 4B). At the boundaries of the images, all the integrations preferably facilitate periodic boundary conditions.

In various exemplary embodiments of the invention one or more adaptation terms are calculated using intensity levels of each picture element of the surrounding and remote regions. These adaptation terms are denoted herein as $\sigma_r$, where r is a regional index, r, as described above. In various exemplary embodiments of the invention two adaptation terms are defined, $\sigma_{center}$ and $\sigma_{surround}$.

Each of the adaptation terms $\sigma_{center}$ and $\sigma_{surround}$ preferably comprises a local part and a remote part, to account for the influence of the remote region:

$$\sigma_r = \sigma_{r,\,local} + \sigma_{r,\,remote}, \qquad (EQ. 5)$$

where "r"="center" or "surround". $\sigma_{center,\,local}$ is preferably a function of the overall center intensity $G_{center}$, and $\sigma_{center,\,remote}$ is preferably a function of overall remote intensity $G_{remote}$. Similarly, $\sigma_{surround,\,local}$ is preferably a function of the overall surround intensity $G_{surround}$, and $\sigma_{surround,\,remote}$ is preferably a function of overall remote intensity $G_{remote}$. The local parts and the remote parts of the center and surround adaptation terms determine the relative weight of the remote region on each adaptation term.

The local parts of $\sigma_{center}$ and $\sigma_{surround}$ are preferably calculated as linear functions of the regional overall intensities (with either constant or variable coefficients).

$$\sigma_{r,\,local} = \alpha_r G_r + \beta_r, \qquad (EQ. 6)$$

The value of the coefficients $\alpha_r$ and $\beta_r$ ("r"="center" or "surround") may be selected in accordance with the dynamic range of the image. The coefficient $\beta_r$ generally controls the amount of adaptation which is performed by the adaptation terms. More specifically, as can be understood by inspecting Equation 6, $\beta_r$ functions as an adaptation threshold, where for large values of $\beta_r$, the adaptation level is low and for low values of $\beta_r$, the adaptation level is high. The amount of the required adaptation can also depend on the intensity at a particular picture element or on the intensity of a group of picture elements, e.g., the picture elements populating the remote region or more. Thus, in these embodiments $\beta_r$ is a function rather than a constant coefficient. According to some of these embodiments, $\beta_r$ is an increasing function of the intensity, so that for low intensity regions the amount of adaptation is high and for high intensity regions the amount of adaptation is low.

Although the coefficients of Equation 6 are mathematical coefficients, they are preferably based on electro-physiological findings. In accordance with the above physiological "gain control", each of the center and surround adaptation term independently characterizes a dynamical intensity curve. The coefficients $\alpha_r$ are thus determine the degree of curve-shifting, for example, higher values of $\alpha_r$ lead to higher shifting amount of the response curve. The combination between $\alpha_r$ and $\beta_r$ determine the onset of the gain-control mechanism, hence $\alpha_r$ and $\beta_r$ serve as gain thresholds.

The remote parts of $\sigma_{center}$ and $\sigma_{surround}$ can be calculated using one or more adaptation weights denoted $MRM_r$ ("r"="center" or "surround"):

$$\sigma_{r,\,remote} = MRM_r G_{remote}. \qquad (EQ. 7)$$

Generally, $MRM_r$ can be a constant or it can vary with one or more of the regional intensities. In some embodiments of the present invention the same adaptation weight $MRM_r$ is used for the calculation of the remote parts of both $\sigma_{center}$ and $\sigma_{surround}$, and in some embodiments of the present invention the adaptation weight used for the calculation of the remote part of $\sigma_{center}$ differ from that used for the calculation of the remote part of $\sigma_{surround}$. For example, in some embodiments the adaptation weight used for the calculation of the remote part of $\sigma_{center}$ is a function of one or more of the regional intensities and the adaptation weight used for the calculation of the remote part of $\sigma_{surround}$ is a constant.

As can be seen form Equation 7, the remote parts of $\sigma_{center}$ and $\sigma_{surround}$ are defined as a multiplication between the adaptation weight and the overall remote intensity. The adaptation weights modulate the adaptation in accordance with the intensity levels of picture elements in the remote region. A particular feature of the adaptation weights is that these functions serve also for preserving and/or improving the contrast of the image, in a manner that will be now described.

At the vicinity of element 40, a local-contrast can be defined as the difference between the intensity level of element 40 and the picture elements of the surrounding region, where a large difference is interpreted as a higher local-contrast and a low difference is interpreted as a lower local-contrast. This difference may be calculated by more than one way, for example, by subtraction, division, subtraction of logarithms, discrete differentiation, discrete logarithmic differentiation or any other suitable mathematical operation between intensity levels. The adaptation weights can be functions which are selected in accordance with the local-contrast calculations. Specifically, in regions in which the local-contrast is high these functions have small numerical values and in regions in which the local-contrast is low these functions have higher numerical values.

The adaptation weight of the present embodiments describes, at least in part, contrast induction between the surrounding region and the remote region of element 40.

Optionally and preferably the adaptation weight features a plurality of different resolutions, wherein a contrast induction is calculated separately for each resolution. For example, for each resolution, contrast inductions are calculated using subtractions between intensity levels integrated over the surrounding region and intensity levels integrated over the central region.

Mathematically, this procedure can be expressed as follows. Let $L^k_r$ be an intensity integrated over the region r (r=center or surround) at resolution k. A representative expression for $L^k_r$ can be:

$$L^k_r = \int I * f^k_r ds, \quad \text{(EQ. 8)}$$

where the integration of spans over the respective (center or surround) region, $f^k_r$ are spatial profiles at resolution k, which may have the same properties as the spatial profiles $f_r$ of Equation 4, and I is the intensity level of element 40, preferably following the selective contrast enhancement procedure described above. Thus, in various exemplary embodiments of the invention $I=I_{exp}$. The resolution of the spatial profiles is preferably expressed as a local support of the respective profile.

For example, when the profile is a Gaussian profile, $f^k_r$ can be written as (r=center or surround):

$$f^k_r(x, y) = \frac{1}{\sqrt{\pi}\, \rho^k_r} \exp\left(-\frac{x^2 + y^2}{(\rho^k_r)^2}\right) \quad \text{(EQ. 9)}$$

where $\rho^k_r$ is the local support of region r for resolution k. Typically, the surround profile for a given resolution has a three times larger support area and a radius which is two times larger than of that of the center profile. Thus, the present embodiments calculate two series of integrated intensities $L^k_{center}$ (k=1, 2, . . . ) and $L^k_{surround}$ (k=1, 2, . . . ). For each series, each element features a profile of different support, and therefore each such series is based on a series of profiles which is based on a series of radii. Representative examples of the series of radii $\rho^k_{center}$ and $\rho^k_{surround}$ are provided in the Examples section that follows.

Once the integrated intensities $L^k_r$ are calculated, they are preferably subtracted to provide a contrast induction $L^k_{tot}$ for each resolution k:

$$L^k_{tot} = L^k_{center} - L^k_{surround} \quad \text{(EQ. 10)}$$

The contrast inductions are then used for calculating a local contrast quantifier $C_{local}$ and a remote contrast quantifier $C_{remote}$. $C_{local}$ can be calculated as a sum over all resolution of an inner product or convolution of the absolute value of $L^k_{tot}$ with a local spatial profile $W_{local}$:

$$C_{local}(i, j) = \sum_{local\ area} \sum \left( \sum_{k=1}^{num\ of\ scales} |L^k_{total}| \right)(x, y) \cdot W_{local}(i-x, j-y). \quad \text{(EQ. 11)}$$

$C_{remote}$ can be calculated as a sum over all resolution of an inner product or convolution of $C_{local}$ with a remote spatial profile $W_{remote}$:

$$C_{remote}(i, j) = \sum_{remote\ area} \sum C_{local}(x, y) \cdot W_{remote}(i-x, j-y) \quad \text{(EQ. 12)}$$

Note that in Equations 11 and 12, the convolutions are expressed in a discrete form. The skilled person provided with the details described herein would know how to adjust the convolution to a more general case by replacing the summation over the local area with an integration as further detailed hereinabove. The local and remote spatial profile can have properties are preferably which are similar to the other profiles described above, but their support area is preferably larger.

In some embodiments of the present invention $W_{local}$ has a Gaussian shape and $W_{remote}$ has an annular Gaussians shape:

$$W_{local}(x, y) = \frac{1}{\sqrt{\pi}\, \rho_{local}} \exp\left(-\frac{x^2+y^2}{\rho_{local}^2}\right) \quad \text{(EQ. 13)}$$

$$W_{remote}(x, y) = \frac{1}{\sqrt{\pi}\, \rho_{remote}} \exp\left(-\frac{x^2+y^2}{\rho_{remote}^2}\right).$$

The radius $\rho_{local}$ is preferably larger, e.g., two times larger than $\rho^k_{center}$ for the coarsest resolution, and the radius $\rho_{remote}$ is preferably larger, e.g., two times larger than $\rho^k_{surround}$ for the coarsest resolution.

Once the local and remote contrast inductions are calculated, the center and surround adaptation weights can be calculated as follows:

$$MRM_{center} = C_{local,\, max} - C_{local}$$

$$MRM_{remote} = C_{remote,\, max} - C_{remote} \quad \text{(EQ. 14)}$$

where $C_{local,\, max}$ and $C_{remote,\, max}$ are the maximal values of $C_{local}$ and $C_{remote}$ over a region of predetermined size. A typical radius of such region is about two- or three times the radius of the remote region.

A visual representation of the contrast quantifier calculation is schematically illustrated in FIG. 5. The outer large circle represents the "remote" area that is defined by the Gaussian profile $W_{remote}$, the inner circle represents the "local" area that is defined by the Gaussian profile $W_{local}$, and the distributed small circles of different sizes illustrate the "center-surround" profiles of different resolutions.

The effect of contrast quantifiers for a mammogram is shown in FIGS. 6A-C, where FIG. 6A shows the input mammogram, FIG. 6B shows the local contrast quantifier $C_{local}$ (x,y), and FIG. 6C shows the remote contrast quantifier $C_{remote}$(x,y).

Once the adaptation terms $\sigma_{center}$ and $\sigma_{surround}$ are calculated, the companding procedure preferably assigns a new intensity level to element 40 based the adaptation terms. The new intensity level is in a second dynamic range which is smaller than dynamic range of the original image. The second dynamic range is preferably displayable on a display device, as further detailed hereinabove.

The assignment of a new intensity level $I_{res}$ is preferably according to the following equation:

$$I_{res} = d_{cen} \cdot \frac{G_{cen}}{G_{cen} + \sigma_{cen}} - d_{smd} \frac{G_{smd}}{G_{smd} + \sigma_{smd}} \quad (EQ. 15)$$

where, $d_{cen}$ and $d_{smd}$ are constants.

In various exemplary embodiments of the invention the method proceeds to 15 at which a noise reduction procedure is employed. Generally, the noise reduction serves for reducing excessive graininess which is that is inconvenient for an observing eye. The present inventors found that the excessive graininess is originated from white noise with some localized distribution (e.g., Gaussian distribution) that existed earlier in the original image but was not prominent due to high dynamic range of the image. FIGS. 7A-C illustrate the noise in a mammogram following the application of operations 11-14, where FIG. 7A is the processed mammogram, FIG. 7B is an enlarge view of a generally empty area (marked at the lower right corner of FIG. 7A) and FIG. 7C is a histogram of intensities over the area of FIG. 7B. As shown, the noise has a localized distribution over the image. It was found by the present inventor that an anisotropic diffusion procedure can be employed for reducing the noise in the image.

This is particularly useful for a mammogram since in a mammogram traditional noise reduction techniques, such as moving average, frequency domain LPF and Wiener filter may result it loss of valuable information for correct diagnosis. A suitable anisotropic diffusion procedure for the present embodiments is found in Mayo et al., 2006, EMBS '06, 28th Annual International Conference of the IEEE, and Weickert, J., 2001, Pattern Recognition, 34 (9), 1813-1824.

An anisotropic diffusion procedure suitable for the present embodiments will now be described.

The model considered herein for noisy image is defined as:

$$f = \tilde{f} + n$$

where f is the observed image, and it is a sum of an ideal noise-free image $\tilde{f}$ and a noise signal n. It is assumed that noise is a white noise with Gaussian distribution centered at zero.

A variational method for image restoration from noisy images is obtained as a minimizer of energy functional:

$$s[u] = \int_\Omega \left[ \Phi(|\nabla u|) + \frac{1}{2}\mu(u-f)^2 \right] dx dy$$

where u is the filtered image and μ is a Lagrange multiplier. The first summand rewards smoothness, and the second summand encourages similarity between the restored image and the original one.

The second summand is derived from the following constraint:

$$\int_\Omega (u-f)^2 dx dy = \sigma^2 \int_\Omega dx dy$$

where σ is the standard deviation of the noise. The regulizer Φ is defined as:

$$\Phi(|\nabla u|) = \sqrt{\beta^2 + |\nabla u|^2} + \epsilon |\nabla u|^2$$

where β and ε are constant parameters. The first summand of Φ is responsible for anisotropic diffusion, and the second summand is for linear diffusion.

From variational calculus, it follows that the minimizer of s[u] satisfies the Euler-Lagrange equation:

$$div\left( \frac{\Phi'(|\nabla u|)}{|\nabla u|} \nabla u \right) + \mu(f-u) = 0$$

This can be regarded as the steady-state (t→∞) of the diffusion process given by gradient descend:

$$u_t = -\frac{ds[u]}{du} = div\left( \frac{\Phi'(|\nabla u|)}{|\nabla u|} \nabla u \right) + \mu(f-u)$$

where $\frac{\Phi'(|\nabla u|)}{|\nabla u|}$ represents a diffusion coefficient. Φ derivative is:

$$\Phi'(|\nabla u|) = \frac{|\nabla u|}{\sqrt{\beta^2 + |\nabla u|^2}} + \varepsilon |\nabla u|$$

Thus, the total anisotropic diffusive process with Newman boundary condition is:

$$\begin{cases} u_t = div\left( \frac{\nabla u}{\sqrt{\beta^2 + |\nabla u|^2}} \right) + \varepsilon \nabla^2 u + \mu(f-u) \\ u_n |_{\partial\Omega} = 0 \end{cases}$$

Full development of diffusive process equations and its discretization is provided in the Examples section that follows.

The stopping criterion for the diffusive process can be as follows. Assuming that the unknown noise n is uncorrelated with the unknown signal $\tilde{f}$, the noise reduction procedure minimizes the covariance of the "noise" f−u(t) with the filtered image u(t), or employ its normalized form, the correlation coefficient:

$$corr(f-u(t), u(t))$$

The stopping time T can be selected such that the expression is as small as possible. Thus, In some embodiments of the present invention the stopping criterion is defined as:

$$T = \mathrm{argmin}_t |\mathrm{corr}(f - u(t), u(t))|$$

At 16 the method outputs the processed image to a computer readable medium or a display device.

The method ends at 17.

Reference is now made to FIG. 8, which is a simplified illustration of a system 70 for processing an image, according to various exemplary embodiments of the present invention. In some embodiments of the present invention system 70 comprises an input unit 72 for inputting a plurality of picture elements which form the image. As further detailed hereinabove, the plurality of picture elements contains intensity values, and includes the arbitrarily chosen element 40, to which the following description refers. System 70 comprises a preprocessing unit 74 which preprocesses the input image to remove isolated objects from the image as further detailed hereinabove. In various exemplary embodiments of the invention unit 74 is configured for executing one or more of the operations of method 10 described above.

System 70 further comprises a companding unit 78 which applies a companding procedure to the preprocessed image, so as to reduce the dynamic range of the image. In various exemplary embodiments of the invention unit 78 is configured for executing one or more of the operations of the companding procedure described above. In some embodiments of the present invention the dynamic range is reduced to a second dynamic range which is displayable on a display device 80. In some embodiments of the present invention system 70 comprises display device 80.

Reference is now made to FIG. 9 which is a simplified illustration of an imaging and processing system 90, according to various exemplary embodiments of the present invention. System 90 preferably comprises an imaging system 92 which acquire an image of a living subject. Preferably, system 92 acquires a mammogram, but other types of images are not excluded from the scope of the present invention. Preferably system 92 acquires digital images in which the intensity or grey-level values are relative and not absolute. Representative examples for system 92 including, without limitation, a mammography system, an X-ray system other than a CT scanner, a gamma camera system, a PET system, a SPECT system, a thermal imaging system and the like.

System 90 further comprises an image processing system 94 which processes the image and provides a processed image having a second dynamic range which is smaller than the first dynamic range. In various exemplary embodiments of the invention image processing system 94 comprises system 70. In some embodiments image processing apparatus 94 is system 70.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Processing of Mammograms

Embodiments of the present invention have been utilized for processing mammograms.

Images were acquired by KODAK and GE workstations. The KODAK CR mammography station acquires the images analogically and converts them to digital, while the GE DR station acquires images digitally.

The images were supplied by department of diagnostic imaging from the Sheba medical center, Israel. The common format for digital mammograms is the DICOM format. This format contains an uncompressed image data and a file header which contains information about the patient, the examination and different image properties. The spatial resolution of KODAK images used in the present example is 49 μm/pixel and the matrix size is 4784×3584; the matching properties of GE images are 94 μm/pixel and 2294×1914. The contrast resolution of both modalities is 12 bits/pixel ($2^{12}$ gray levels). The images were stored in BMP format.

The mapping function parameters employed were as follows. For the GE images a and b were fixed (a=0.011, b=0.8) and c was calculated adaptively according to Equation 3A above. For the KODAK images the a, b and c parameters were calculated adaptively based on the original image histogram. Specifically, RL was the fraction of pixels with intensity range of 400-800, c was calculated using Equation 3B with a predetermined intensity range of 400-800, $p_0$=1100 and $p_1$=−100, a was calculated using the linear relation a=0.04−0.001(RL−1)/6 and b was calculated using the linear relation b=0.6−(0.8−0.6)(RL−10)/9.

Representative examples of the mapping function for the KODAK and GE systems are shown in FIGS. 10A and 10B, respectively. The normalization parameters for the images were: I_low=750 and I_high=1250.

The companding procedure is illustrated graphically in FIG. 11.

Each pixel of the input image was simulated as the center region of the opponent receptive field. Accordingly, the center region had a radius of 1 pixel. The surround region was defined as having an outer radius of 9 pixels without including the central pixel. The remote region had an annular shape with inner and outer radius of 9 and 21 pixels, respectively. The inner radius of the remote region was equal to the external diameter of the surround region and therefore did not overlap the center or the surround regions.

The spatial profiles were Gaussian decaying profiles with appropriate variances. The total weights of these functions were normalized to 1. These properties are summarized in Table 1.

TABLE 1

| Region | inner radius | external radius | variance |
|---|---|---|---|
| center | — | 1 | — |
| surround | 1 | 9 | 10 |
| remote | 9 | 21 | 22 |

The parameters for the adaptation terms are summarized in Table 2, below. These values are the optimal values we could select over a large number of simulations on a vast variety of mammograms. The same values were used for all processed mammograms.

TABLE 2

| Parameter | Value | Parameter | Value |
|---|---|---|---|
| $\alpha_{cen}$ | 0.5 | $\alpha_{srnd}$ | 0.3 |
| $\beta_{cen}$ | 1.5 | $\beta_{srnd}$ | 2 |
| $c_{cen}$ | 1.5 | $c_{srnd}$ | 2 |
| $d_{cen}$ | 2.5 | $d_{srnd}$ | −0.5 |

Local Multi-scale contrast was calculated by 6 resolutions. The profile's size and its radius increment between two subsequent resolutions were of 2 pixels. For each resolution the center radius was of the same size as the profile's size. The radius for the matching surround profile was twice larger. The different sizes and the compatible radii at the different resolutions, are summarized in Table 3.

TABLE 3

| resolution index | $f_{cen}^{k}$ size [pixels] | $\rho_{cen}^{k}$ size [pixels] | $f_{srnd}^{k}$ size [pixels] | $\rho_{srnd}^{k}$ size [pixels] |
|---|---|---|---|---|
| 1 | 1 | 1 | 3 | 2 |
| 2 | 3 | 3 | 9 | 6 |
| 3 | 5 | 5 | 15 | 10 |
| 4 | 7 | 7 | 21 | 14 |
| 5 | 9 | 9 | 27 | 18 |
| 6 | 11 | 11 | 33 | 22 |

The calculations of $C_{local}$ were performed with a $\rho_{local}$ radius (variance of Gaussian profile) of 4 pixels. The calculations of $C_{remote}$ quantifier were performed with a $\rho_{remote}$ radius of 12 pixels. The sizes of the profiles $W_{local}$ and $W_{remote}$ were 20 and 60 pixels, respectively, where $W_{remote}$ has an annular shape with internal radius of 20 pixels.

For the anisotropic diffusion filter, the following parameters were used β=1, ε=0.04, and Δt=0.1. The parameter μ was calculated iteratively as explained in Example 3, below.

Example 2

Clinical Test

The processing method described in Example 1 was applied to mammograms which were thereafter analyzed by expert radiologists.

Methods

The study included 40 female subjects. For each subject 2 or 4 mammograms were acquired (2 of right breast, 2 of left breast or 2 of each breast). The two mammograms of the same breast were the craniocaudal and the mediolateral-oblique views, both used for the diagnosis of a single breast.

70 different mammograms were chosen for analysis, 20 cancerous mammograms and 50 benign mammograms. The gold standard for cancerous mammograms was biopsy. The gold standard for benign mammograms was a two-year follow up of benign results. The different cases were selected to allow variety of lesions. A high resolution monitor of 5 MP was used to perform the test.

Two expert radiologists were independently presented with the mammograms, blinded to patient's identity. Initially, each expert radiologist was provided with mammograms processed in accordance with some embodiments of the present invention as described in Example 1 above. Each expert radiologist analyzed the processed mammograms and provided an expert diagnosis which included specifying all lesions found and ranking the respective mammograms according to the Breast Imaging Reporting and Data System (BIRADS) scale. The BIRADS scale is presented in Table 4, below. Expert No. 1 analyzed mammograms Nos. 1-70 and Expert No. 2 analyzed mammograms Nos. 23-70.

At least two weeks later, the expert radiologists were provided with the unprocessed versions of the mammograms (namely mammograms as provided by the mammography systems) for a second analysis. It is assumed that the second analysis was unbiased by the results of the first analysis. Following the second analysis the expert radiologists provided an expert diagnosis which included specifying all lesions found and ranking the respective mammograms according to the BIRADS scale. Same as before expert No. 1 analyzed mammograms Nos. 1-70 and Expert No. 2 analyzed mammograms Nos. 23-70.

The input from the experts was subjected to a Receiver Operating Characteristic (ROC) analysis [Park et al., 2004, Korean J Radiol, 5(1):11-8]. ROC analysis is suitable for the present study since the BIRADS scale includes five rating categories. An empirical ROC curve was obtained by calculating sensitivity and specificity for four different thresholds ≥2, ≥3, ≥4, ≥5. An estimation of smooth (fitted data) ROC curve was made using maximum likelihood estimation (MLE). To this end, a binormal distribution was assumed for characterizing the shape of the ROC curve using two parameters, $a=(\mu_1-\mu_0)/\sigma_1$ and $b=\sigma_0/\sigma_1$, where $\mu_0, \sigma_0$ and $\mu_1, \sigma_1$ are mean and standard deviation of the test results without and with lesions, respectively.

TABLE 4

| BIRADS Rank | Finding |
|---|---|
| 0 | need additional imaging evaluation |
| 1 | negative |
| 2 | benign |
| 3 | probably benign - short interval follow-up suggested |
| 4 | suspicious abnormality - biopsy should be considered |
| 5 | highly suggestive of malignancy - appropriate action should be taken |

Results

Representative examples of some of the mammograms are shown in FIGS. 12E-F, where FIGS. 12A, 12C and 12E show the unprocessed mammograms (as provided by the conventional mammography system), and FIGS. 12B, 12D and 12F show the mammograms after processing in accordance with some embodiments of the present invention.

Both experts reported that the processed mammograms successfully show all biological features that are required for the diagnosis. In particular, Cooper's ligaments were identified more easily in the processed mammograms.

The BIRADS ranks as provided by the experts are summarized in Table 5. Expert No. 1 tested 70 cases, 20 of which were cancerous and the rest were benign, and expert No. 2 tested 48 cases, 16 of which were cancerous and the rest were benign.

TABLE 5

| | | Processed Mammogram Expert | | Unprocessed Mammogram | |
|---|---|---|---|---|---|
| Case # | Gold Standard | No. 1 BIRADS | Expert No. 2 BIRADS | Radiologist 1 BIRADS | Radiologist 2 BIRADS |
| 1 | benign | 3 | | 2 | |
| 2 | benign | 1 | | 2 | |
| 3 | benign | 2 | | 2 | |
| 4 | benign | 2 | | 2 | |
| 5 | benign | 3 | | 3 | |
| 6 | benign | 1 | | 2 | |
| 7 | benign | 3 | | 2 | |
| 8 | benign | 3 | | 3 | |
| 9 | benign | 3 | | 3 | |
| 10 | benign | 3 | | 2 | |
| 11 | benign | 1 | | 1 | |
| 12 | benign | 1 | | 1 | |
| 13 | benign | 3 | | 2 | |
| 14 | benign | 3 | | 2 | |
| 15 | benign | 1 | | 2 | |
| 16 | benign | 3 | | 1 | |
| 17 | benign | 3 | | 2 | |
| 18 | benign | 2 | | 2 | |
| 19 | cancerous | 1 | | 1 | |
| 20 | cancerous | 4 | | 4 | |
| 21 | benign | 1 | | 1 | |
| 22 | cancerous | 2 | | 2 | |
| 23 | benign | 2 | 5 | 2 | 4 |
| 24 | cancerous | 5 | 4 | 5 | 4 |
| 25 | benign | 4 | 2 | 4 | 2 |
| 26 | cancerous | 4 | 4 | 5 | 3 |
| 27 | benign | 1 | 2 | 1 | 2 |
| 28 | cancerous | 3 | 5 | 2 | 5 |
| 29 | benign | 1 | 2 | 1 | 2 |
| 30 | cancerous | 5 | 4 | 5 | 3 |
| 31 | benign | 2 | 5 | 2 | 5 |
| 32 | cancerous | 4 | 2 | 4 | 1 |
| 33 | cancerous | 5 | 2 | 5 | 1 |
| 34 | benign | 1 | 2 | 2 | 4 |
| 35 | benign | 1 | 3 | 1 | 4 |
| 36 | benign | 2 | 1 | 1 | 2 |
| 37 | benign | 2 | 4 | 4 | 2 |
| 38 | benign | 1 | 1 | 1 | 2 |
| 39 | benign | 2 | 1 | 4 | 2 |
| 40 | benign | 1 | 1 | 1 | 2 |
| 41 | benign | 1 | 2 | 3 | 2 |
| 42 | benign | 1 | 3 | 3 | 3 |
| 43 | benign | 2 | 1 | 2 | 2 |
| 44 | benign | 2 | 2 | 2 | 2 |
| 45 | benign | 1 | 2 | 1 | 2 |
| 46 | benign | 1 | 2 | 1 | 1 |
| 47 | benign | 1 | 2 | 3 | 1 |
| 48 | benign | 1 | 4 | 3 | 4 |
| 49 | benign | 1 | 2 | 1 | 2 |
| 50 | benign | 2 | 2 | 4 | 2 |
| 51 | benign | 1 | 3 | 1 | 4 |
| 52 | benign | 2 | 2 | 1 | 2 |
| 53 | benign | 2 | 2 | 2 | 2 |
| 54 | benign | 2 | 3 | 2 | 2 |
| 55 | benign | 2 | 5 | 2 | 5 |
| 56 | benign | 2 | 2 | 1 | 3 |
| 57 | cancerous | 5 | 5 | 5 | 5 |
| 58 | benign | 2 | 5 | 2 | 5 |
| 59 | cancerous | 5 | 4 | 5 | 4 |
| 60 | cancerous | 5 | 3 | 5 | 3 |
| 61 | cancerous | 4 | 5 | 5 | 4 |
| 62 | benign | 2 | 2 | 2 | 2 |
| 63 | cancerous | 3 | 4 | 4 | 4 |
| 64 | benign | 2 | 2 | 2 | 2 |
| 65 | cancerous | 5 | 4 | 4 | 4 |
| 66 | benign | 1 | 3 | 3 | 3 |
| 67 | cancerous | 4 | 4 | 5 | 5 |
| 68 | cancerous | 3 | 5 | 2 | 5 |
| 69 | cancerous | 4 | 4 | 3 | 3 |
| 70 | cancerous | 5 | 3 | 5 | 2 |

The ROC analyses for Expert Nos. 1 and 2 are shown in FIGS. 13A-B (Expert No. 1) and 14A-B (Expert No. 2). Shown in FIGS. 13A and 14A are the true positives fraction (TPF) as a function of the false positives fraction (FPF) obtained for the empirical data. Shown in FIGS. 13B and 14B are the TPF as a function of the FPF obtained for the fitted data.

Tables 6 and 7 summarize the ROC areas as calculated for the empirical and fitted data for Expert No. 1 (Table 6) and Expert No. 2 (Table 7).

TABLE 6

|  | Empirical ROC Area | Fitted ROC area |
|---|---|---|
| unprocessed mammograms | 0.853 | 0.867 |
| processed mammograms | 0.904 | 0.913 |

TABLE 7

|  | Empirical ROC Area | Fitted ROC area |
|---|---|---|
| unprocessed mammograms | 0.925 | 0.937 |
| processed mammograms | 0.95 | 0.958 |

Tables 8 and 9 summarize the empirical values of the TPF and FPF as obtained for Expert No. 1 (Table 8) and Expert No. 2 (Table 9), for a threshold of ≥4 (meaning that BIRADS score which is 4 or above indicates the presence of cancer).

TABLE 8

|  | Empirical TPF | Empirical FPF |
|---|---|---|
| unprocessed mammograms | 0.75 | 0.22 |
| processed mammograms | 0.85 | 0.18 |

TABLE 9

|  | Empirical TPF | Empirical FPF |
|---|---|---|
| unprocessed mammograms | 1 | 0.25 |
| processed mammograms | 1 | 0.2812 |

The results presented in this example demonstrate that the processing technique of the present embodiments increase the sensitivity without decreasing the specificity. The increment in ROC curve area demonstrates the effectiveness of the inventive processing technique.

Example 3

Nonlinear Diffusive Filter

The model considered herein for noisy image is:

$$f = \tilde{f} + n$$

where f is the observed image, and it is a sum of an ideal noise-free image $\tilde{f}$ and a noise signal n. Variational method is employed for image restoration from noisy images obtain a filtered version of some degraded image f as the minimizer of energy functional:

$$s[u] = \int_\Omega \left[ \Phi(|\nabla u|) + \frac{1}{2}\mu(u-f)^2 \right] dx\, dy$$

where u is the filtered image and μ the Lagrange multiplier. The first summand rewards smoothness, while the second summand encourages similarity between the restored image and the original one. The second summand is derived from the constraint:

$$\int_\Omega (u-f)^2 dx\, dy = \sigma^2 \int_\Omega dx\, dy$$

where σ is the noise standard deviation. The regulizer Φ is a potential which is defined as:

$$\Phi(|\nabla u|) = \sqrt{\beta^2 + |\nabla u|^2} + \epsilon |\nabla u|^2$$

where β and ε are constant parameters. The first summand of Φ is responsible for anisotropic diffusion, and the second summand is for linear diffusion. From variational calculus:

$$ds = \lim_{\varepsilon \to 0} \frac{s[u + \varepsilon \eta(x,y)] - s[u]}{\varepsilon} =$$

$$= \int_\Omega \left[ \left( \frac{d\Phi(|\nabla u|)}{du} + \frac{1}{2}\mu \frac{d(u-f)^2}{du} \right) \eta(x,y) + \frac{d\Phi(|\nabla u|)}{du_x}\eta_x(x,y) + \frac{d\Phi(|\nabla u|)}{du_y}\eta_y(x,y) \right] dx\, dy =$$

$$= \int_\Omega \left[ \frac{d\Phi(|\nabla u|)}{du}\eta(x,y) + \frac{d\Phi(|\nabla u|)}{du_x}\eta_x(x,y) + \frac{d\Phi(|\nabla u|)}{du_y}\eta_y(x,y) \right] dx\, dy + \int_\Omega \mu(u-f)\eta\, dx\, dy$$

η(x, y) is a function by which u changes, and it fulfills η(x, y)|$_{\partial\Omega}$=0.

The first summand is equal to zero. Therefore:

$$ds = \int_\Omega \left[ \Phi' \frac{d|\nabla u|}{du_x}\eta_x(x,y) + \Phi' \frac{d|\nabla u|}{du_y}\eta_y(x,y) \right] dx\, dy + \int_\Omega \mu(u-f)\eta\, dx\, dy =$$

$$= \int_\Omega \left[ \Phi' \frac{u_x}{|\nabla u|}\eta_x(x,y) + \Phi' \frac{u_y}{|\nabla u|}\eta_y(x,y) \right] dx\, dy + \int_\Omega \mu(u-f)\eta\, dx\, dy =$$

$$= \int_\Omega \frac{\Phi'}{|\nabla u|} \vec\nabla u \vec\nabla \eta\, dx\, dy + \int_\Omega \mu(u-f)\eta\, dx\, dy$$

Using Green's first identity for the first summand one obtains:

$$ds = \int_{\partial\Omega} \frac{\Phi'}{|\nabla u|} \vec\nabla u \cdot (\eta \cdot \hat n) - \int_\Omega div\left( \frac{\Phi'}{|\nabla u|}\vec\nabla u \right)\eta\, dx\, dy + \int_\Omega \mu(u-f)\eta\, dx\, dy =$$

$$= \int_{\partial\Omega} \frac{\Phi'}{|\nabla u|} \cdot \eta \cdot (\vec\nabla u \cdot \hat n) - \int_\Omega div\left( \frac{\Phi'}{|\nabla u|}\vec\nabla u \right)\eta\, dx\, dy + \int_\Omega \mu(u-f)\eta\, dx\, dy =$$

$$= \int_{\partial\Omega} \frac{\Phi'}{|\nabla u|} \cdot \eta \cdot \left( \frac{du}{d\vec n} \right) - \int_\Omega div\left( \frac{\Phi'}{|\nabla u|}\vec\nabla u \right)\eta\, dx\, dy + \int_\Omega \mu(u-f)\eta\, dx\, dy$$

Using Derichle boundary condition η(x, y)|$_{\partial\Omega}$=0. Using Newman boundary condition $$\left. \frac{du}{d\vec n} \right|_{\partial\Omega} = 0.$$

In any case, the boundary integral equals zero. Therefore:

$$ds = -\int_\Omega \operatorname{div}\left(\frac{\Phi'}{|\nabla u|}\vec{\nabla}u\right)\eta\, dx\, dy - \int_\Omega \mu(f-u)\eta\, dx\, dy \qquad 5$$

The goal of the present embodiments is to minimize the functional s[u]. Since η is different from zero everywhere except the boundaries, it is not a factor in the minimization. Hence:

$$\frac{ds[u]}{du} = -\operatorname{div}\left(\frac{\Phi'(|\nabla u|)}{|\nabla u|}\nabla u\right) - \mu(f-u)$$

The minimizer of s[u] satisfies the Euler-Lagrange equation:

$$\operatorname{div}\left(\frac{\Phi'(|\nabla u|)}{|\nabla u|}\nabla u\right) + \mu(f-u) = 0$$

This can be regarded as the steady-state (t→∞) of the diffusion process given by gradient descend:

$$u_t = -\frac{ds[u]}{du} = \operatorname{div}\left(\frac{\Phi'(|\nabla u|)}{|\nabla u|}\nabla u\right) + \mu(f-u)$$

where $\frac{\Phi'(|\nabla u|)}{|\nabla u|}$ represents a diffusion coefficient in anisotropic diffusion. the derivative of $\Phi$ is:

$$\Phi'(|\nabla u|) = \frac{|\nabla u|}{\sqrt{\beta^2 + |\nabla u|^2}} + \varepsilon|\nabla u|$$

Thus, the accepted total anisotropic diffusive process is:

$$u_t = \operatorname{div}\left(\left(\frac{1}{\sqrt{\beta^2 + |\nabla u|^2}} + \varepsilon\right)\nabla u\right) + \mu(f-u)$$

$$= \operatorname{div}\left(\frac{\nabla u}{\sqrt{\beta^2 + |\nabla u|^2}}\right) + \varepsilon\nabla^2 u + \mu(f-u)$$

The chosen boundary condition for the above process is Newman condition (minor reflecting condition):

$$u_n|_{\partial\Omega} = 0$$

Discretization of the Process

Following is a description for calculating the first summand of the above equation.

$$\text{Denote } c(|\nabla u|) = \frac{1}{\sqrt{\beta^2 + |\nabla u|^2}} \cdot \operatorname{div}(c(|\nabla u|)\nabla u)$$

$$= \frac{d}{dx}(c(|\nabla u|)\cdot u_x) + \frac{d}{dy}(c(|\nabla u|)\cdot u_y) =$$

-continued $$= \frac{d}{dx}(c(|\nabla u|))\cdot u_x + c(|\nabla u|)\cdot u_{xx} +$$
$$\frac{d}{dy}(c(|\nabla u|))\cdot u_y + c(|\nabla u|)\cdot u_{yy}$$

Calculation of the first summand of the above equation:

$$\frac{d}{dx}(c(|\nabla u|)) = \frac{dc(|\nabla u|)}{d|\nabla u|} \cdot \frac{d|\nabla u|}{dx} =$$

$$= \frac{dc(|\nabla u|)}{d|\nabla u|} \cdot \frac{d\sqrt{u_x^2 + u_y^2}}{dx} =$$

$$= \frac{dc(|\nabla u|)}{d|\nabla u|} \cdot \left(\frac{d\sqrt{u_x^2 + u_y^2}}{du_x}\cdot u_{xx} + \frac{d\sqrt{u_x^2 + u_y^2}}{du_y}\cdot u_{yx}\right) =$$

$$= -\frac{|\nabla u|}{(\beta^2 + |\nabla u|^2)^{3/2}} \cdot \left(\frac{u_x u_{xx}}{\sqrt{u_x^2 + u_y^2}} + \frac{u_y u_{yx}}{\sqrt{u_x^2 + u_y^2}}\right) =$$

$$= -\frac{u_x u_{xx} + u_y u_{yx}}{(\beta^2 + |\nabla u|^2)^{3/2}}$$

Calculation of the third summand of the above equation:

$$\frac{d}{dy}(c(|\nabla u|)) = \frac{dc(|\nabla u|)}{d|\nabla u|} \cdot \frac{d|\nabla u|}{dy} =$$

$$= \frac{dc(|\nabla u|)}{d|\nabla u|} \cdot \frac{d\sqrt{u_x^2 + u_y^2}}{dy} =$$

$$= \frac{dc(|\nabla u|)}{d|\nabla u|} \cdot \left(\frac{d\sqrt{u_x^2 + u_y^2}}{du_y}\cdot u_{yy} + \frac{d\sqrt{u_x^2 + u_y^2}}{du_x}\cdot u_{yx}\right) =$$

$$= -\frac{|\nabla u|}{(\beta^2 + |\nabla u|^2)^{3/2}} \cdot \left(\frac{u_y u_{yy}}{\sqrt{u_x^2 + u_y^2}} + \frac{u_x u_{yx}}{\sqrt{u_x^2 + u_y^2}}\right) =$$

$$= -\frac{u_y u_{yy} + u_x u_{yx}}{(\beta^2 + |\nabla u|^2)^{3/2}}$$

Using the above div(c(|∇u|)∇u) becomes:

$$\operatorname{div}(c(|\nabla u|)\nabla u) = -\frac{u_x u_{xx} + u_y u_{yx}}{(\beta^2 + |\nabla u|^2)^{3/2}}\cdot u_x + c(|\nabla u|)\cdot u_{xx} -$$

$$\frac{u_y u_{yy} + u_x u_{yx}}{(\beta^2 + |\nabla u|^2)^{3/2}}\cdot u_y + c(|\nabla u|)\cdot u_{yy} =$$

$$= -\frac{u_x^2 u_{xx} + u_x u_y u_{yx}}{(\beta^2 + |\nabla u|^2)^{3/2}} + \frac{u_{xx}}{\sqrt{\beta^2 + |\nabla u|^2}} -$$

$$\frac{u_y^2 u_{yy} + u_x u_y u_{yx}}{(\beta^2 + |\nabla u|^2)^{3/2}} + \frac{u_{yy}}{\sqrt{\beta^2 + |\nabla u|^2}} =$$

$$= \frac{-u_x^2 u_{xx} - 2u_x u_y u_{yx} - u_y^2 u_{yy} +}{u_{xx}(\beta^2 + |\nabla u|^2) + u_{yy}(\beta^2 + |\nabla u|^2)}}{(\beta^2 + |\nabla u|^2)^{3/2}}$$

$$= \frac{u_{xx}(\beta^2 + |\nabla u|^2 - u_x^2) - 2u_x u_y u_{yx} +}{u_{yy}(\beta^2 + |\nabla u|^2 - u_y^2)}}{(\beta^2 + |\nabla u|^2)^{3/2}} =$$

$$= \frac{u_{xx}(\beta^2 + u_y^2) - 2u_x u_y u_{yx} +}{u_{yy}(\beta^2 + u_x^2)}}{(\beta^2 + u_x^2 + u_y^2)^{3/2}}$$

The total discrete diffusive process is:

$$u^{n+1} = u^n + t \cdot \left( \frac{u_{xx}^n(\beta^2 + u_y^{n2}) - 2u_x^n u_y^n u_{yx}^n + u_{yy}^n(\beta^2 + u_x^{n2})}{(\beta^2 + u_x^{n2} + u_y^{n2})^{3/2}} + \varepsilon(u_{xx}^n + u_{yy}^n) + \mu(f - u^n) \right)$$

The first derivatives $u_x$ and $u_y$ can be calculated by central derivative approximations:

$$u_{x,ij} = \frac{u_{i,j+1} - u_{i,j-1}}{2dx} = \frac{1}{2}(u_{i,j+1} - u_{i,j-1})$$

$$u_{y,ij} = \frac{u_{i+1,j} - u_{i-1,j}}{2dy} = \frac{1}{2}(u_{i+1,j} - u_{i-1,j})$$

The second derivatives $u_{xx}$, $u_{yy}$ and $u_{xy}$ can be calculated as follows:

$$u_{xx,ij} = u_{i,j+1} - 2u_{i,j} + u_{i,j-1}$$

$$u_{yy,ij} = u_{i+1,j} - 2u_{i,j} + u_{i-1,j}$$

$$u_{xy,ij} = \frac{1}{4}(u_{i-1,j-1} - u_{i-1,j+1} - u_{i+1,j-1} + u_{i+1,j+1})$$

The parameter $\mu$ is calculated iteratively from Euler-Lagrange equation:

$$\text{div}\left(\frac{\Phi'(|\nabla u|)}{|\nabla u|} \nabla u\right) + \mu(f - u) = 0$$

The equation is multiplied by (f−u) and integrated over the image area:

$$\int_\Omega (f - u) \cdot \text{div}\left(\frac{\Phi'(|\nabla u|)}{|\nabla u|} \nabla u\right) dxdy = -\mu \int_\Omega (f - u)^2 dxdy$$

$$= -\mu \sigma^2 \int_\Omega dxdy$$

$$\mu = \frac{1}{\sigma^2 \int_\Omega dxdy} \cdot \int_\Omega (u - f) \cdot \text{div}\left(\frac{\Phi'(|\nabla u|)}{|\nabla u|} \nabla u\right) dxdy$$

The discrete form of $\mu$ is:

$$\mu^n = \frac{1}{\sigma^2 M \cdot N} \cdot \sum_i \sum_j (u^n - f) \cdot$$

$$\left( \frac{u_{xx}^n(\beta^2 + u_y^{n2}) - 2u_x^n u_y^n u_{yx}^n + u_{yy}^n(\beta^2 + u_x^{n2})}{(\beta^2 + u_x^{n2} + u_y^{n2})^{3/2}} + \varepsilon(u_{xx}^n + u_{yy}^n) \right)$$

where M and N are the sizes of the image.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of processing an image having a plurality of picture-elements, comprising:
   preprocessing the image to selectively enhance contrast of some picture-elements of the image using a mapping function for diminishing image data with intensity levels below an intensity threshold, thereby providing a preprocessed image, said mapping function having a plateau region for intensity levels below said intensity threshold, and increasing monotonically for any intensity level of said image above said intensity threshold;
   employing a companding procedure for said preprocessed image, thereby providing a processed image; and
   outputting said processed image to a computer readable medium or a display device.

2. The method according to claim 1, further comprising removing isolated objects from the image, prior to said selective contrast enhancement.

3. Non-transitory computer-readable medium having stored thereon a computer program, wherein said computer program comprising code means that when executed by a data processing system carry out the method according of claim 1.

4. The method according to claim 2, wherein said removal of said isolated objects features a connected components labeling procedure.

5. The method according to claim 1, wherein said intensity threshold is an average intensity over all picture-elements of the image having intensity levels within a predetermined intensity range.

6. The method according to claim 1, wherein the image is an image of a section of a living body and said intensity threshold is correlated with intensity levels characterizing fatty tissue present in said body section.

7. The method according to claim 1, wherein said mapping function comprises a monotonic region for intensity levels above said intensity threshold.

8. The method according to claim 1, wherein said companding procedure comprises, for each picture element of said preprocessed image:
   (i) defining a surrounding region of picture elements and a remote region of picture elements;
   (ii) calculating at least one adaptation weight; and
   (iii) using said at least one adaptation weight and intensity levels of each picture element of said surrounding and said remote regions, for assigning a new intensity level to said picture element, said new intensity level being in a dynamic range which is smaller than the dynamic range of said preprocessed image.

9. The method according to claim 8, wherein said adaptation weight describes, at least in part, contrast induction between said surrounding region and said remote region.

10. The method according to claim 9, wherein said adaptation weight features a plurality of different resolutions, and wherein said contrast induction is calculated separately for each resolution.

11. The method according to claim 10, wherein for each resolution, said contrast induction is calculated as a subtraction between intensity levels integrated over said surrounding region and intensity levels integrated over a central region.

12. A method according to claim 1, further comprising employing anisotropic diffusion procedure for reducing noise.

13. The method according to claim 1, wherein said image is a mammography image.

14. The method according to claim 13, wherein said processed image exhibits Cooper's ligaments.

15. The method according to claim 13, further comprising identifying and highlighting Cooper's ligaments in said processed image.

16. The method according to claim 1, wherein said image is an X-ray image other than a CT image.

17. The method according to claim 1, wherein said image is a gamma image.

18. The method according to claim 1, wherein said image is a PET image.

19. The method according to claim 1, wherein said image is a SPECT image.

20. The method according to claim 1, wherein said image is a thermal image.

21. A system for processing an image having a plurality of picture-elements, comprising:
an input unit for receiving the image;
a preprocessing unit configured for preprocessing the image to selectively enhance contrast of some picture-elements of the image using a mapping function for diminishing image data with intensity levels below an intensity threshold, hence to provide a preprocessed image, said mapping function having a plateau region for intensity levels below said intensity threshold, and increasing monotonically for any intensity level of said age above said intensity, threshold; and
a companding unit which compands said preprocessed image.

22. The system according to claim 21, further comprising an imaging system for acquiring the image, wherein said input unit receives the image from said imaging system.

23. The system according to claim 21, wherein said preprocessing unit is configured for removing isolated objects from the image, prior to said selective contrast enhancement.

24. A system according to claim 21, further comprising a noise reduction unit configured for employing anisotropic diffusion procedure.

25. The system according to claim 21, wherein said image is a mammography image and wherein the system further comprises a functionality for highlighting Cooper's ligaments in said processed image.

* * * * *